US010743474B1

(12) United States Patent
Schlimgen et al.

(10) Patent No.: US 10,743,474 B1
(45) Date of Patent: Aug. 18, 2020

(54) DUAL AUGER DRIVE SYSTEM

(71) Applicant: Unverferth Manufacturing Co., Inc., Kalida, OH (US)

(72) Inventors: Ronald J. Schlimgen, Shell Rock, IA (US); Michael D. Van Mill, Shell Rock, IA (US)

(73) Assignee: UNVERFERTH MANUFACTURING CO., INC., Kalida, OH (US)

(*) Notice: Subject to any disclaimer, the term of this patent is extended or adjusted under 35 U.S.C. 154(b) by 0 days.

(21) Appl. No.: 16/359,255

(22) Filed: Mar. 20, 2019

(51) Int. Cl.
*B65G 33/14* (2006.01)
*A01D 90/10* (2006.01)
*B60P 1/42* (2006.01)

(52) U.S. Cl.
CPC .............. *A01D 90/10* (2013.01); *B60P 1/42* (2013.01); *B65G 33/14* (2013.01); *B65G 2201/042* (2013.01)

(58) Field of Classification Search
CPC ................................. B60P 1/40; B65G 33/14
USPC ........................................................ 414/505
See application file for complete search history.

(56) References Cited

U.S. PATENT DOCUMENTS

| 2,438,301 | A | 3/1948 | Schulte |
|---|---|---|---|
| 2,883,076 | A | 4/1959 | Palmer |
| 2,960,320 | A | 11/1960 | Heider |
| 3,098,555 | A | 7/1963 | Harriott |
| 3,337,068 | A | 8/1967 | Meharry |
| 3,575,306 | A | 4/1971 | Obermeyer et al. |
| 3,664,525 | A | 5/1972 | Herbsthofer |
| 3,717,272 | A | 2/1973 | Chartier et al. |
| 3,872,982 | A | 3/1975 | Rowland-Hill et al. |
| 4,093,087 | A | 6/1978 | Decoene |
| 4,411,581 | A | 10/1983 | Niewold |
| 4,419,037 | A | 12/1983 | Niewold |
| 4,503,803 | A | 3/1985 | Barnes |
| 4,714,398 | A | 12/1987 | Rohwedder |
| 4,824,312 | A | 4/1989 | Schiltz |
| 5,409,344 | A | 4/1995 | Tharaldson |

(Continued)

OTHER PUBLICATIONS

J&M Manufacturing Co., "Dual Auger: 32 Series," http://www.jm-inc.com/dual_auger.php.

(Continued)

*Primary Examiner* — Saul Rodriguez
*Assistant Examiner* — Willie Berry, Jr.
(74) *Attorney, Agent, or Firm* — Rothwell, Figg, Ernst & Manbeck, P.C.

(57) ABSTRACT

A dual auger grain cart includes a horizontal auger assembly, a vertical auger assembly, and a drive assembly operatively connected to the horizontal and vertical auger assemblies. The horizontal and vertical auger assemblies each include an auger shaft and flighting disposed on the auger shaft. The drive assembly includes a first member operatively connected to the horizontal auger shaft, a second member operatively connected to the vertical auger shaft, and a power input device operatively connected to the first and second drive members to drive rotation of the horizontal and vertical auger shafts. The arrangement of the first and second members allow the longitudinal axes of the horizontal and vertical auger shafts to be coplanar and the vertical auger flighting to extend at least in part below the longitudinal axis of the horizontal auger shaft.

17 Claims, 12 Drawing Sheets

(56) References Cited

U.S. PATENT DOCUMENTS

| | | | |
|---|---|---|---|
| 5,468,113 A | 11/1995 | Davis | |
| 5,906,471 A | 5/1999 | Schwoerer | |
| 6,497,546 B2 | 12/2002 | Wood et al. | |
| 6,776,569 B1 * | 8/2004 | McMahon | B60P 1/40 198/666 |
| 8,702,368 B2 | 4/2014 | Van Mill et al. | |
| 9,185,845 B2 | 11/2015 | Van Mill et al. | |
| 9,187,259 B2 | 11/2015 | Van Mill et al. | |
| 9,205,715 B2 | 12/2015 | Van Mill et al. | |
| 9,216,681 B1 | 12/2015 | Van Mill et al. | |
| 9,272,853 B2 | 3/2016 | Van Mill et al. | |
| 9,457,850 B2 | 10/2016 | Van Mill | |
| 9,457,854 B2 | 10/2016 | Van Mill et al. | |
| 9,596,805 B2 | 3/2017 | Van Mill et al. | |
| 9,596,809 B2 | 3/2017 | Van Mill et al. | |
| 9,706,713 B2 | 7/2017 | Van Mill et al. | |
| 9,723,789 B2 | 8/2017 | Van Mill et al. | |
| 9,873,570 B2 | 1/2018 | Van Mill et al. | |
| 10,028,434 B2 | 7/2018 | Van Mill et al. | |
| 10,028,441 B2 | 7/2018 | Van Mill et al. | |
| 10,071,669 B2 | 9/2018 | Kinzenbaw | |
| 10,160,367 B2 | 12/2018 | Van Mill | |
| 2006/0180062 A1 | 8/2006 | Furrer et al. | |
| 2008/0210145 A1 | 9/2008 | Petersen et al. | |
| 2011/0164952 A1 | 7/2011 | Hollenberg | |
| 2017/0290270 A1 | 10/2017 | Van Mill et al. | |
| 2018/0244477 A1 | 8/2018 | Stilborn et al. | |
| 2019/0000016 A1 * | 1/2019 | Friesen | A01D 90/14 |

OTHER PUBLICATIONS

Elmer's Manufacturing Inc., "Haulmaster Grain cart," https://elmersmfg.com/haul-master-grain-cart/.

Kinze 1105-1305-1500DA Manual, "Dual Auger Grain Carts", Extract (pp. 1, 20 and 24).

* cited by examiner

DUAL AUGER DRIVE SYSTEM

FIELD OF THE DISCLOSURE

This disclosure relates generally to farm implements, and more particular, to grain carts having a dual auger for unloading grain from the cart, and drive systems therefor.

BACKGROUND

Carts, such as grain carts, can be used to shorten harvesting time by improving the efficiency of harvesting equipment such as combines. Such carts can, for example, be used to transport grain from harvesters or combines in the field to grain trucks or bins at the side of the field. Carts are often preferred for use compared to grain bins or grain trucks because grain bins are typically immobile and grain trucks typically do not perform well in muddy or rough field conditions and have the potential to spark fires in dry fields. Carts usually comprise a bin (e.g., a container, hopper, or box) sitting atop a wheeled frame in combination with an auger means or mechanism for unloading grain from the bin. Carts can be designed to handle soft or rough fields with ease and can be designed to be drawn by a tractor alongside a combine that unloads its contents into the cart.

Carts can be used to enable a combine to continue to harvest while unloading the grain into the cart. This grain unloading arrangement can increase productivity dramatically because combines need never stop to unload. In addition, it is not necessary for the combines themselves to travel to grain trucks or bins at the side of the field each time the combine is full. After a cart is loaded with grain or other material by one or more combines, the grain is unloaded from the cart into a bin for temporary storage or into a waiting grain truck for transport to another location, such as a grain elevator. Because carts offer a combination of economy, versatility, production savings, and maneuverability, they have been widely accepted by farmers and widely produced by equipment manufacturers.

Carts capable of unloading grain directly into a grain truck or bin often use a conveyor to do so. Often the conveyor is in the form of an auger. Various auger configurations are known. Auger structures can, for example, be contained inside the hopper structure, located entirely outside of it, or in another desired location. Auger configurations can, for example, have a single auger or multiple augers. The auger structure can, for example, be located at the front, side, back, corner, or another desired location of the cart.

In a dual auger grain cart, a lower, horizontally disposed drag auger can, for example, receive material from the hopper and deposit it into an upper, vertically disposed lift auger. The upper auger can then, for example, carry the material received from the lower auger and deposit it into a trailer, such as a grain trailer. Triple auger configurations are also known, which can include, for example, a lower, horizontally disposed drag auger, a vertically disposed lift auger, and an upper, horizontally disposed discharge auger. A typical auger for a grain cart includes an auger screw that is housed inside a tubular housing. Typically, there is a drive mechanism used to drive the horizontal and vertical augers that is coupled to the horizontal and vertical augers. For example, the drive mechanism coupled to the augers may cause the auger screws to turn.

In a dual auger type grain cart, the vertical auger may be limited to discharging grain on one side of the grain cart. In such a situation, an operator is limited during an unloading operation, and must unload from the side of the grain cart where the vertical auger is located. Accordingly, some grain carts offer the ability for the vertical auger to discharge on either side of the grain cart (e.g. on the left side or the right side). To do so, the vertical auger needs to be able to move between a left-side discharge position and a right-side discharge position. Typically, left or right is determined from the perspective of a cab operator sitting in a cab of a tractor pulling the farm implement. For such a cart capable of unloading on either left or right sides, a drive mechanism for the two augers needs to function when in both the left-side and right-side discharge positions.

Some known dual auger grain carts drive the horizontal drag augers from the front of the vertical housing by extending a shaft through the vertical auger housing. In such carts, the horizontal drag auger shaft extends through the vertical housing, thereby forcing the vertical auger to be offset, or positioned below, the horizontal drag auger drive shaft. The offset vertical auger arrangement increases the height of the drag auger centerline, which may increase the height or length of the hopper, thereby raising the center of gravity of the grain cart such that the grain cart is less stable. Alternatively, grain carts that include an offset arrangement between the vertical auger and the horizontal auger drive shaft may include a wider frame, tongue, or hitch to accommodate for the spacing between the offset augers. Widening the frame, tongue, or hitch, however, hinders the maneuverability of the grain cart and requires more material for constructing the grain cart, which increases the overall cost of manufacturing. Other double auger carts position the drive assembly between the vertical and horizontal augers. This drive assembly can be external or internal relative to the auger housings. This arrangement requires that the drive assembly for the augers extend beyond the corresponding auger centerlines, which does not allow the flighting rotation to operate beyond the opposite auger's centerline. For example, the vertical auger flighting cannot extend beyond the horizontal auger centerline, and the horizontal auger flighting cannot extend beyond the vertical auger centerline.

Still other double auger carts drive the horizontal auger from the rear end of the grain cart. This drive system requires at least one drive shaft with support bearings running alongside the horizontal auger; and a set of sprockets with roller chain, belt pulleys with belts, or gearboxes, to transmit power over from the drive shaft to the horizontal auger centerline. In some other conventional double auger carts, the drive system typically includes a motor disposed on the back of the drag auger.

Known dual auger type grain carts and their corresponding drive systems have additional shortcomings. For example, in carts where the horizontal drag auger shaft extends through the vertical housing, the vertical auger is offset from (e.g. positioned below) the horizontal drag auger drive shaft. In this arrangement, if such carts are used to unload from both sides, one of the unload positions (e.g. left or right) would have the vertical auger being offset above the horizontal auger drive shaft. This auger arrangement creates a substantially flighting-free space in the transition zone (e.g., junction box area) between the horizontal and vertical augers, thereby increasing the likelihood of grain getting stuck or compressed at the transition zone. The collection or compression of grain at the transition zone causes grain damage, higher wear on the auger flighting edge, uneven distribution of grain material through the auger housing, and a higher amount of grain material stuck at the transition zone.

As another example of a shortcoming, in carts where the vertical auger flighting does not extend beyond the horizontal auger centerline, the flighting's operating zones cannot operate below the centerline. That means that grain must be pushed in spaces around the drive mechanism that are free of flighting. These substantially flighting-free spaces may be to the sides of the drive mechanism, above the drive mechanism, or some combination of both. As mentioned above, this substantially flighting-free space in this transition zone (e.g. junction box area) between the augers is undesirable. Additionally, with the grain being pushed up and/or around the drive mechanism, there would be a higher level of grain compression, which can result in further grain damage. Still another example of a shortcoming, is that in carts where the horizontal auger is driven from the rear end, mechanisms, such as drive shafts universal joints and gearboxes, are frequently used to convey the power from the front of the unit to the rear of the drag auger, resulting in added cost, maintenance and complexity. Furthermore, if the vertical auger pivots to adjust the unload discharge height or moves to unload on both sides, at least one additional driveline assembly would be needed to transmit power from the vertical auger gearbox to the driveshaft driving the horizontal auger. Furthermore, the driveline assembly typically includes uneven driveline joint angles to accommodate for the movement of the vertical auger. The uneven driveline joint angles, however, may cause high angular velocity variations between the auger assemblies or even curtail the operability of the auger assembly.

Accordingly, there is a need to provide improved dual auger type grain carts.

SUMMARY

According to a first aspect, embodiments of a farm implement are provided. In some embodiments, the farm implement may include a frame; a container mounted on the frame and configured to hold agricultural material, the container having a container opening to receive agricultural material and a discharge opening for discharging agricultural material; a first auger assembly disposed in the container and operable to move agricultural material from the container toward the discharge opening; a second auger assembly including an inlet in communication with the discharge opening to receive agricultural material therefrom and an outlet to discharge agricultural material; and a drive assembly. In some embodiments, the first auger assembly may include a first auger section comprising a first auger shaft configured to rotate about a longitudinal axis of the first auger section and a first helical flighting disposed along the first auger shaft. In some embodiments, the second auger assembly may include a second auger section comprising a second auger shaft configured to rotate about a longitudinal axis of the second auger section and a second helical flighting disposed along the second auger shaft. In some embodiments, a first end of the first auger shaft may be located at or around the discharge opening of the container is in proximity with a second end of the second auger shaft located at or around the inlet of the second auger assembly. In some embodiments, the drive assembly may include a first member disposed at the first end of the first auger shaft and operably connected to the first auger shaft to drive the first auger shaft. In some embodiments, the drive assembly may further include a second member disposed at the second end of the second auger shaft and operably connected to the second auger shaft to drive the second auger shaft. In some embodiments, a power input device may be connected to the first and second members of the drive assembly. In some embodiments, the longitudinal axes of the first and second auger sections may be substantially coplanar. In some embodiments, the second helical flighting may extend at least in part below the longitudinal axis of the first auger section when the second auger assembly is in an operating position.

In some embodiments, the power input device may be an input shaft configured to be driven by a power take-off (PTO). In some embodiments, the second auger assembly may be moveable between a first operating position capable of discharging grain on a first side of the farm implement and a second operating position capable of discharging grain on a second side of the farm implement. In some embodiments, the second auger assembly may be angled such that the longitudinal axes of the first and second auger sections are not orthogonal. In some embodiments, the second auger assembly may be angled forward such that an angle between the longitudinal axis of the second auger section and the longitudinal axis of the first auger section is greater than 45 degrees.

In some embodiments, the second auger assembly may further include a third auger section comprising a third auger shaft configured to rotate about a longitudinal axis of the third auger section and a third helical flighting disposed along the third auger shaft. In some embodiments, the second auger assembly may further include a joint connecting the second and third auger sections together and defining a pivot axis about which the third auger section is pivotable relative to the second auger section. In some embodiments, the second auger assembly may further include a folding assembly configured to pivot the second and third auger sections between an operating position in which the second and third helical flighting are operably coupled to permit grain to be discharged from the container and a transport position in which the third auger section extends along a wall of the container to facilitate transporting the grain cart.

In some embodiments, the power input device may be connected between the first and second members of the drive assembly. In some embodiments, the drive assembly may include a transmission shaft directly coupled to the input shaft and operatively connected to the first member such that the transmission shaft is configured to transmit torque applied by the input shaft to the first member. In some embodiments, the transmission shaft may be substantially axially aligned with respect to the input shaft. In some embodiments, the drive assembly may include a first gear assembly operatively connecting the transmission shaft to the first member, and the first gear assembly may include two or more gears substantially aligned in a vertical direction between the first member and the transmission shaft.

In some embodiments, the drive assembly may include a clutch tube received around the transmission shaft, and the clutch tube may be configured to rotate with the transmission shaft and comprises one or more cogs disposed at a first end of the clutch tube. In some embodiments, the clutch tube may be configured to slide along the transmission shaft in an axial direction between an engaged position, wherein the one or more cogs engage the first gear assembly so that torque is applied from the transmission shaft to the first gear assembly, and a disengaged position. In some embodiments, the one or more cogs may be spatially separated from the first gear assembly so that torque is not applied from the transmission shaft to the first gear assembly. In some embodiments, the drive assembly may include a clutch actuator shaft operatively connected to the clutch tube to actuate movement of the clutch tube between the disengaged and engaged positions. In some embodiments, the clutch actuator shaft may be configured to move the clutch tube from the engaged position to the disengaged position when a torque applied to the first auger assembly exceeds a predetermined maximum operation torque.

In some embodiments, the drive assembly may include a second gear assembly operatively connecting the input shaft to the second drive member. In some embodiments, the second gear assembly may include a first bevel gear received around the input shaft and a second bevel gear received around the second drive member. In some embodiments, the first bevel gear may be configured to rotatably engage the second bevel gear to transmit torque applied by the input shaft to the second drive member.

In some embodiments, the second auger assembly comprises an intake housing disposed proximate to the inlet. In some embodiments, the drive assembly may include a casing connected to the power input device, first member, and second member. In some embodiments, the casing is disposed in the intake housing. In some embodiments, the casing may define a bore extending parallel with respect to the first auger shaft and a cavity extending substantially orthogonal to the bore and opening into the bore. In some embodiments, the power input device and the second member may extend into the bore of the casing. In some embodiments, the first member may extend into the cavity of the casing.

In some embodiments, the farm implement may include a hydraulic assembly operatively connected to the second auger assembly and configured to move the second auger assembly between the first and second operating positions. In some embodiments, the farm implement may include an electronic over hydraulic (EOH) valve block assembly in communication with the hydraulic assembly and configured to control flow of a hydraulic fluid in the hydraulic assembly. In some embodiments, the farm implement may include a control device operatively connected to the EOH valve block assembly and configured to transmit a command to the EOH valve block assembly to actuate movement of the second auger assembly between the first and second operating positions.

In some embodiments, the control device may include a user interface configured to input one or more commands to the control device. In some embodiments, the one or more commands may include a predetermined operation position command. In some embodiments, in response to receiving the predetermined operation position command via the user interface, the control device may be configured to transmit a command to the EOH valve block assembly to actuate movement of the second auger assembly to a predetermined operation position wherein the second auger assembly is capable of discharging grain on either the first side or the second side of the farm implement.

According to various embodiments described in the present disclosure, arranging the first and second auger shafts to be coplanar and extending the second auger flighting below the centerline of the first auger shaft can minimize substantially flighting-free space along the second auger assembly proximate to the discharge opening of the grain cart. Minimizing substantially flighting-free space along the second auger assembly promotes substantially even distribution of agricultural material throughout the length of the first and second auger assemblies and reduces grain compression around the drive assembly. In addition, according to various embodiments described in the present disclosure, arranging the first and second auger shafts to be coplanar allows the first auger centerline and overall height of the grain cart to be positioned lower to the ground, which provides more room for a combine unload auger, lowers the center of gravity of the grain cart for increased stability, and allows the possibility to shorten the hopper length.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
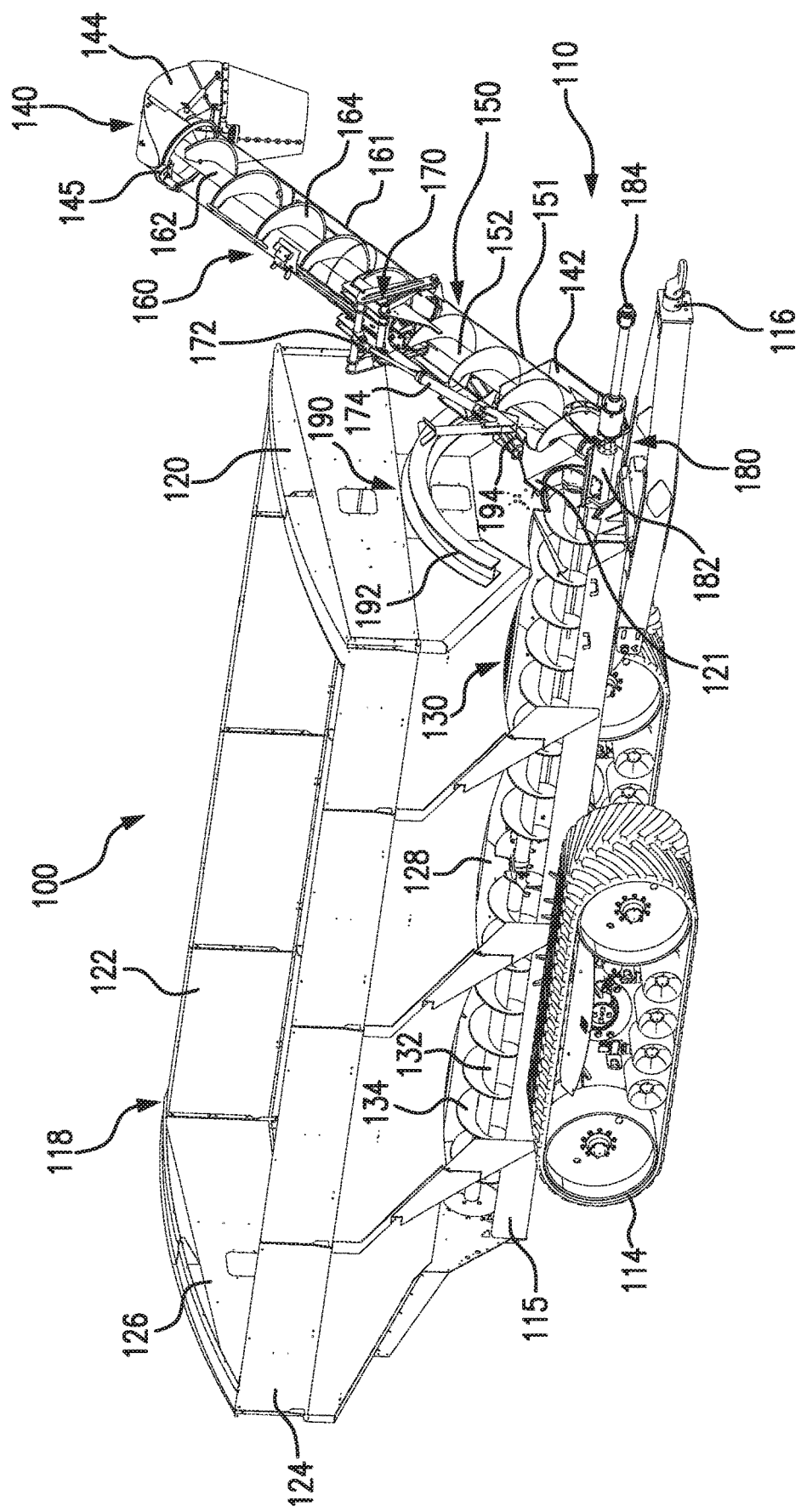
FIG. 1 is a perspective view of a grain cart having a dual auger assembly with the tubular housing depicted as transparent according to an exemplary embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by persons of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

Although the terms horizontal and vertical are used here with respect to augers, such augers may not be completely horizontal or completely vertical. For example, the vertical auger may be angled so as to increase a side reach and/or forward reach of the auger relative to the hopper. Likewise, the horizontal auger may have a slope to it, and may also move with the hopper as the grain cart travels over uneven terrain. The terms denote the general direction in which grain is moved, e.g. horizontal movement to displace grain to a lift auger or vertical movement to lift grain to a discharge height.

FIG. 1 depicts an exemplary grain cart 100 with a dual auger assembly 110 according to an embodiment of the present invention. As shown, the grain cart includes a grain holding container or hopper 118 mounted on a frame 115 with tracks 114 for moving the grain cart 100 and a hitch 116 for coupling the grain cart 100 to a vehicle (such as a tractor). In some embodiments, the grain cart may include wheels instead of (or in addition to) tracks 114. The hopper 118 includes a front wall or side 120, laterally opposed side walls 122 and 124, and a rear wall 126 or side, which together define a grain holding space with a bottom, and which may have an open top. In some embodiments, as shown in FIG. 1, the opposed side walls 122 of the hopper 118 are angled toward each other to form a trough 128 that extends along a bottom of the hopper 118 to promote grain flow toward the bottom of the hopper 118. In some embodiments the walls may be curved, or sloped differently than shown, in order to promote grain flow toward the bottom of the hopper 118.

The dual auger assembly 110 includes a horizontal auger assembly 130 disposed toward a bottom of or below the hopper 118 and extending substantially along the trough 128 of the hopper 118 so as to receive grain flow falling or flowing toward the bottom of the hopper 118. In some embodiments, the horizontal auger assembly 130 may extend along a substantial portion of the length of the hopper 118, up to and including the entire length of the hopper 118. The horizontal auger assembly 130 is configured to convey agricultural material (such as grain) collected at the bottom of the hopper 118 toward a discharge opening 121 disposed at the front wall 120 of the hopper 118.

The horizontal auger assembly 130 may include one or more auger sections. As shown, the horizontal auger assembly 130 includes an auger section having a horizontal auger shaft 132 extending along the trough 128 of the hopper and defining a longitudinal axis (such as axis A-A shown in FIG. 4) of the auger section. The longitudinal axis may also be referred to as a centerline, where the axis extends through the center of the auger section along its length. The horizontal auger shaft 132 has auger flighting 134 and is configured to rotate about the longitudinal axis of the auger section causing the flighting to also rotate. The auger flighting 134 may be disposed along and project in a radial direction from the horizontal auger shaft 132. In some embodiments, auger flighting 134 may be a helical flighting wrapped or positioned around, and connected to the horizontal auger shaft 132. The horizontal auger shaft 132 extends through the discharge opening 121 of the hopper 118. The horizontal auger shaft 132 includes an end (such as a first end 402 shown in FIG. 4) disposed proximate to the discharge opening 121. The horizontal auger assembly 130 is shown in FIG. 1 for illustrative purposes with the auger shaft and flighting exposed. In some embodiments, the auger shaft and flighting is covered and/or concealed by an auger housing; the auger shaft and flighting may also be covered and/or concealed by one or more of frame 115 and walls or siding of hopper 118. Where an auger housing is used for one or more auger sections of the horizontal auger assembly 130, the housing may include an opening (e.g. an opening on an upper side of the housing) for receiving grain from the hopper 118 and/or trough 128.

Figure 11:
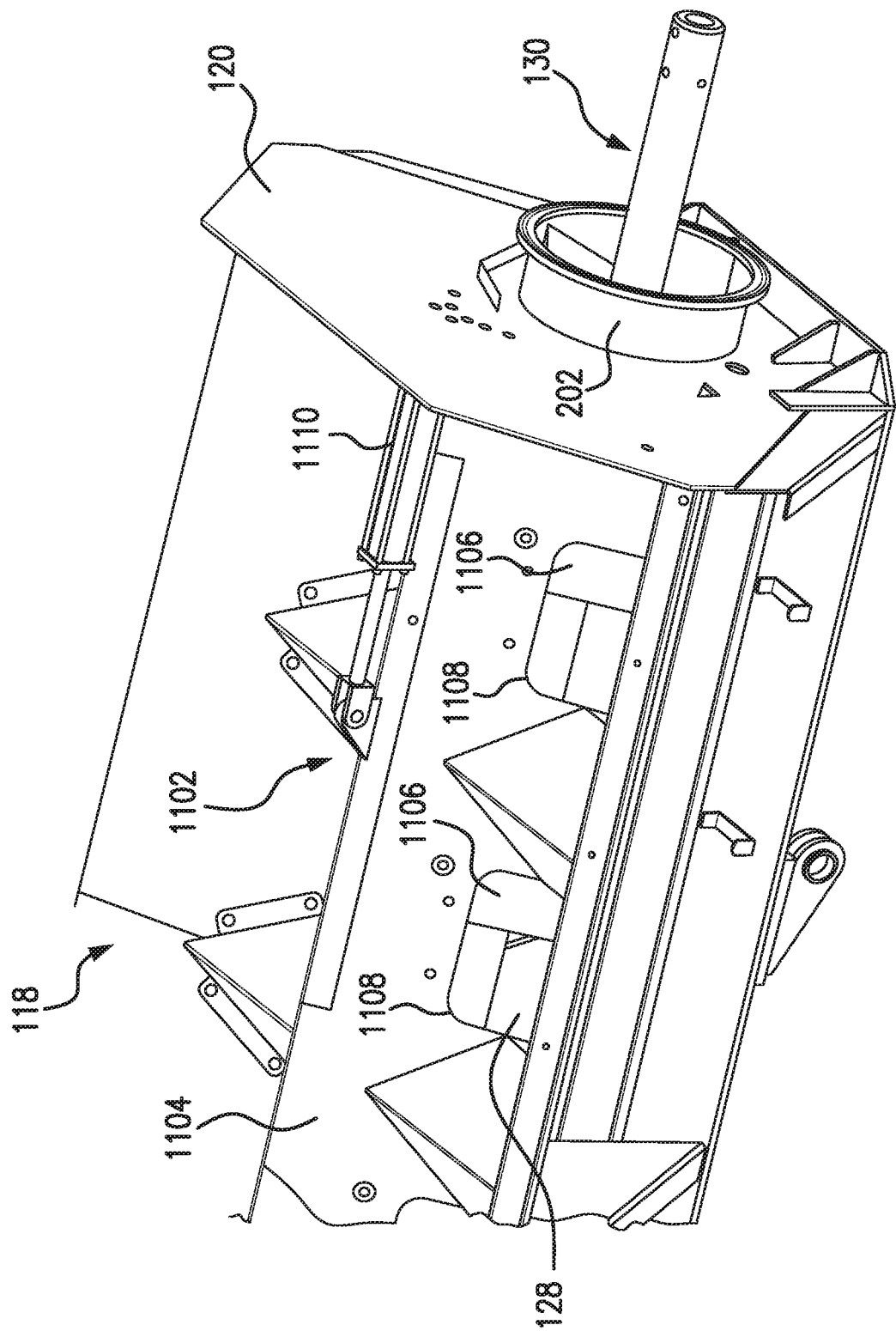
FIG. 11 is a detailed view of a flow gate assembly according to an exemplary embodiment.

In some embodiments, as shown in FIG. 11, the horizontal auger assembly 130 may include a flow gate assembly 1102 disposed along the trough 128 and covering the horizontal auger assembly 130. In some embodiments, the flow gate assembly 1102 may include a first plate 1104 (e.g., external plate) and a second plate 1106 (e.g., internal plate) that overlap each other. The first plate 1104 includes one or more openings 1108. The second plate 1106 is pressed against an interior surface of the first plate 1104 and configured to slide between an open position and closed position to cover or expose the openings 1108 of the first plate 1104. When the second plate 1106 is set in the open position, the one or more openings 1108 of the first plate 1104 are exposed to permit grain flow to the horizontal auger assembly 130. When the second plate 1106 is set in a closed position, the one or more openings 1108 of the first plate 1104 are covered by the second plate 1106 so that grain flow is stopped from reaching the horizontal auger assembly 130. In some embodiments, the flow gate assembly may further include an actuator 1110 (e.g., hydraulic cylinder) operatively connected to the second plate 1106 such that the actuator 1110 is configured to move the second plate 1106 between the open and closed positions.

The exemplary dual auger assembly 110 shown also includes a substantially vertical auger assembly 140 located at a front the grain cart 100. In some embodiments, the vertical auger assembly 140 may be located at a rear, or on another side of the grain cart 100, including at or near a corner of the grain cart 100. Vertical auger assembly 140 includes an intake housing 142 positioned proximate to the discharge opening 121 to receive agricultural material from the bottom of the hopper (via horizontal auger assembly 130). The intake housing 142 defines a junction or transition zone, where agricultural material is received from the horizontal auger assembly 130 and redirected to the vertical auger assembly 140.

The vertical auger assembly 140 may include a discharge portion 144 laterally and forwardly spaced from the hopper 118. As shown, the discharge portion 144 is a spout rotatably coupled to an upper auger housing 161. In some embodiments, the discharge portion 144 includes a rotating actuator 145 (e.g., hydraulic motor with gears) configured to rotate the discharge portion 144 to one or more angular positions. The vertical auger assembly 140 extends upwardly from the intake housing 142 to the discharge portion 144. In some embodiments, the discharge opening 121 opens into the intake housing 142 such that the vertical auger assembly 140 is in communication with the horizontal auger assembly 130. The vertical auger assembly 140 is configured to receive agricultural material discharged from the horizontal auger assembly 130 at the intake housing 142 and convey agricultural material to the discharge portion 144 to facilitate discharge of the agricultural material into another container such as, for instance, another grain cart, semi-trailer, or rail car located to the side or in the vicinity of the grain cart 100.

The vertical auger assembly 140 may include one or more auger sections. As shown, the vertical auger assembly 140 includes a lower auger section 150 and an upper auger section 160. Folding joint assembly 170 connects the lower auger section 150 to the upper auger section 160. Folding joint assembly 170 is configured to connect the lower auger section 150 with the upper auger section 160 such that the upper auger section 160 may be moved between an operating position extending laterally and forwardly outward from the forward corner of the hopper 118 and a transport position folded diagonally across the front wall 120 of the hopper 118, such as one of the auger assemblies described in U.S. Pat. No. 9,039,340, entitled "Grain Cart with Folding Auger"; the entire contents of which are herein incorporated by reference. In some embodiments, the folding joint assembly 170 may include a hinge 172 that pivotably connects the upper auger section 160 to the lower auger section 150 and a folding actuator 174 (e.g., hydraulic cylinder) comprising a rod that is configured to contract and expand to move the upper auger section 160 between the operating position and the transport position. While two auger sections are shown for the vertical auger assembly 140, embodiments may include more auger sections or fewer auger sections, including a single auger section. Additionally, while folding joint assembly 170 is shown as connecting upper auger section 160 and lower auger section 150, other joint assemblies or couplings may be used to connect or join different auger sections together. For example, a universal joint may be used to connect two auger sections together, such as where the two auger sections are angled with respect to each other and the universal joint allows the transfer of rotational force through an angle.

As shown, the lower auger section 150 extends from intake housing 142 near the bottom of hopper 118 to a front corner of the hopper 118 where the one of the laterally opposed side walls 122 or 124 intersects front wall 120. In some embodiments, the lower auger section 150 extends from intake housing 142 to a point proximally adjacent to a front corner, immediately adjacent to a front corner, or disposed at or substantially at a front corner of the hopper 118. As described below, the vertical auger assembly 140 is capable in some embodiments of moving or pivoting substantially in a plane parallel to the front wall 120. In such embodiments, the position of the lower auger section 150 may change as the vertical auger assembly 140 is moved or pivoted.

The lower auger section 150 includes a tubular-shaped lower housing 151 extending from the intake housing 142 and a lower auger shaft 152 disposed within the lower housing 151. The lower auger shaft 152 defines a longitudinal axis (such as axis B-B shown in FIG. 4) of the lower auger section 150. The longitudinal axis may also be referred to as a centerline, where the axis extends through the center of the lower auger section 150 along its length. The lower auger shaft 152 has a lower auger flighting 154 and is configured to rotate about the longitudinal axis of the lower auger section 150 causing the flighting to also rotate. The lower auger flighting 154 may be disposed along and projecting in a radial direction from the lower auger shaft 152. In some embodiments, the lower auger flighting 154 may be a helical flighting wrapped or positioned around, and connected to, the lower auger shaft 152. The lower auger shaft 152 includes an end (such as intake end 404, shown in FIG. 4) disposed in the intake housing 142 and another end (such as discharge end 406, shown in FIG. 4) laterally and forwardly spaced from the hopper 118.

The upper auger section 160 extends from the lower auger section 150 to the discharge portion 144. The upper auger section 160 comprises a tubular-shaped upper housing 161 and an upper auger shaft 162 disposed within the upper housing 161. The upper auger shaft 162 defines a longitudinal axis (such as axis B-B shown in FIG. 4) of the upper auger section 160. The longitudinal axis may also be referred to as a centerline, where the axis extends through the center of the upper auger section 160 along its length. As illustrated, lower and upper auger sections 150 and 160 are in-line with each other, meaning that they share a longitudinal axis (when in an operating, non-folded position). In some embodiments, lower and upper auger sections 150 and 160 may be out-of-line with each other, meaning that they have different, non-parallel longitudinal axes. The upper auger shaft 162 has an upper auger flighting 164 and is configured to rotate about the longitudinal axis of the upper auger section 160 causing the flighting to also rotate. The upper auger flighting 164 may be disposed along and projecting in a radial direction from the upper auger shaft 162. In some embodiments, the upper auger flighting 164 may be a helical flighting wrapped or positioned around, and connected to, the upper auger shaft 162. In some embodiments, referring to FIGS. 3 and 4, the upper auger shaft 162 includes an intake end 408 configured to operatively connect to the discharge end 406 of the lower auger shaft 152 and a discharge end 302 disposed proximate to or in the discharge portion 144. The vertical auger assembly 140 is shown in FIG. 1 for illustrative purposes with the auger shaft and flighting exposed. In some embodiments, the auger shaft and flighting is covered and/or concealed by an auger housing, such as lower auger housing 151 and upper auger housing 161.

Figure 3:
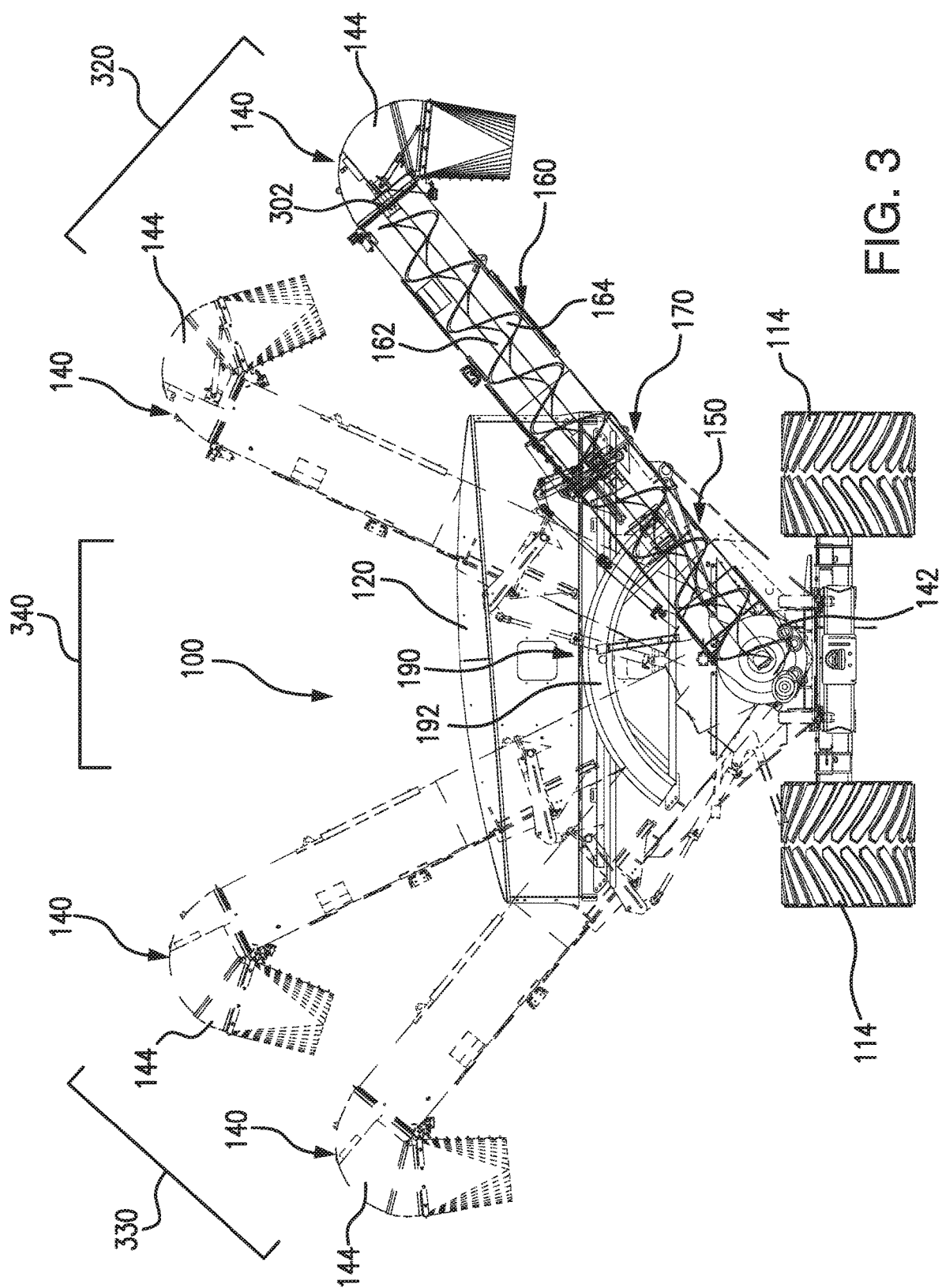
FIG. 3 is a front view a grain cart having a dual auger assembly set in multiple operating positions and the tubular housing depicted as transparent according to an exemplary embodiment.

In some embodiments, grain cart 100 may include a slide assembly 190 that couples the vertical auger assembly 140 to the front wall 120 of the hopper 118. The slide assembly 190 is configured to allow the vertical auger assembly 140 to move or pivot substantially in a plane parallel to the front wall 120. That is, the vertical auger assembly 140 may move or pivot in the left-or-right directions with respect to the front wall 120 of the hopper 118. When doing so, the vertical auger assembly may move between one or more operating positions along a first unloading range 320 where the vertical auger assembly discharges agricultural material on a first side of the grain cart 100 (e.g., a right-hand side of the grain cart 100) and one or more operating positions along a second unloading range 330 where the vertical auger assembly 140 discharges agricultural material on a second side of the grain cart 100 (e.g., a left-hand side of the grain cart 100). In some embodiments, when the vertical auger assembly 140 is set in the operating position, the discharge portion 144 is configured to rotate about the longitudinal axis B-B (shown in FIG. 4) to adjust the angular position of the discharge portion 144. As shown in FIG. 3, while sliding between the first and second unloading ranges, the discharge portion 144 rotates by rotating actuator 145 about the longitudinal axis B-B (shown in FIG. 4) so that the discharge portion 144 is set in a first angular position when the vertical auger assembly is set in a first operating position located along the first unloading range and a second angular position when the vertical auger assembly 140 is set in a second operating position located along the second unloading range. The discharge portion 144 faces in opposite directions when rotating from the first angular position to the second angular position.

In various embodiments, the vertical auger assembly 140 may operate at least two operating positions along either the first or second unloading range 320 and 330 to adjust the height or reach of the discharge portion 144 at either side of grain cart 100. In some embodiments, the first unloading range 320 may be separated from the second unloading range 330 by a predetermined non-loading range 340, where the vertical auger assembly 140 is not configured to discharge agricultural material. In some embodiments, the vertical auger assembly 140 may be located at an operating position disposed along the non-loading range 340 where the vertical auger assembly 140 is oriented substantially upright with respect to the ground. For example, as shown in FIG. 3, a height between the discharge portion 144 and a ground surface changes as the vertical auger assembly 140 moves between several operating positions shown (positions are indicated in the figure by a dashed line showing the position of the vertical auger assembly 140).

Figure 4:
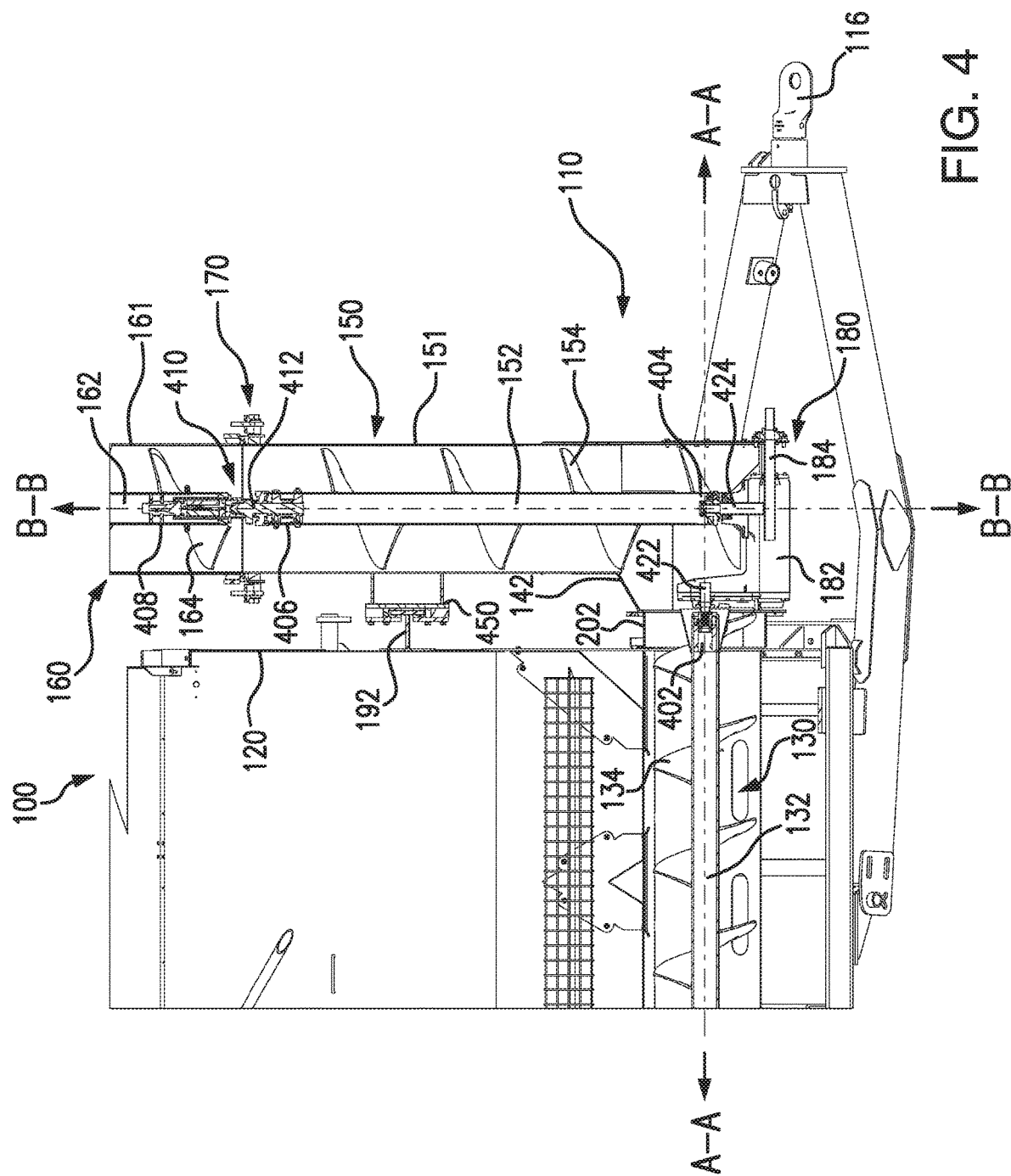
FIG. 4 is a cross-sectional view of the dual auger assembly with the drive assembly according to an exemplary embodiment.

In some embodiments, the slide assembly 190 includes rail 192 projected along the front wall 120 of the hopper 118. As shown in FIG. 4, the slide assembly 190 includes a handle 450 projecting from the lower auger housing 151 and slidably coupled to the rail 192 such that the lower auger section 150 is configured to move along the rail 192 between a first operating position along the first unloading range 320 and a second operating position disposed along the second unloading range 330. The slide assembly 190 may include a sliding actuator 194 (e.g., hydraulic cylinder) operatively connected to the hopper 118 and the vertical auger assembly 140 such that the sliding actuator 194 is configured to move the lower auger section 150 between the one or more operating positions along the first unloading range 320 and one or more operating positions along the second unloading range 330. In some embodiments, the sliding actuator 194 is a hydraulic cylinder configured to expand and retract to move or pivot the lower auger section 150 between the one or more operating positions along the first unloading range 320 and one or more operating positions along the second unloading range 330.

Figure 2:
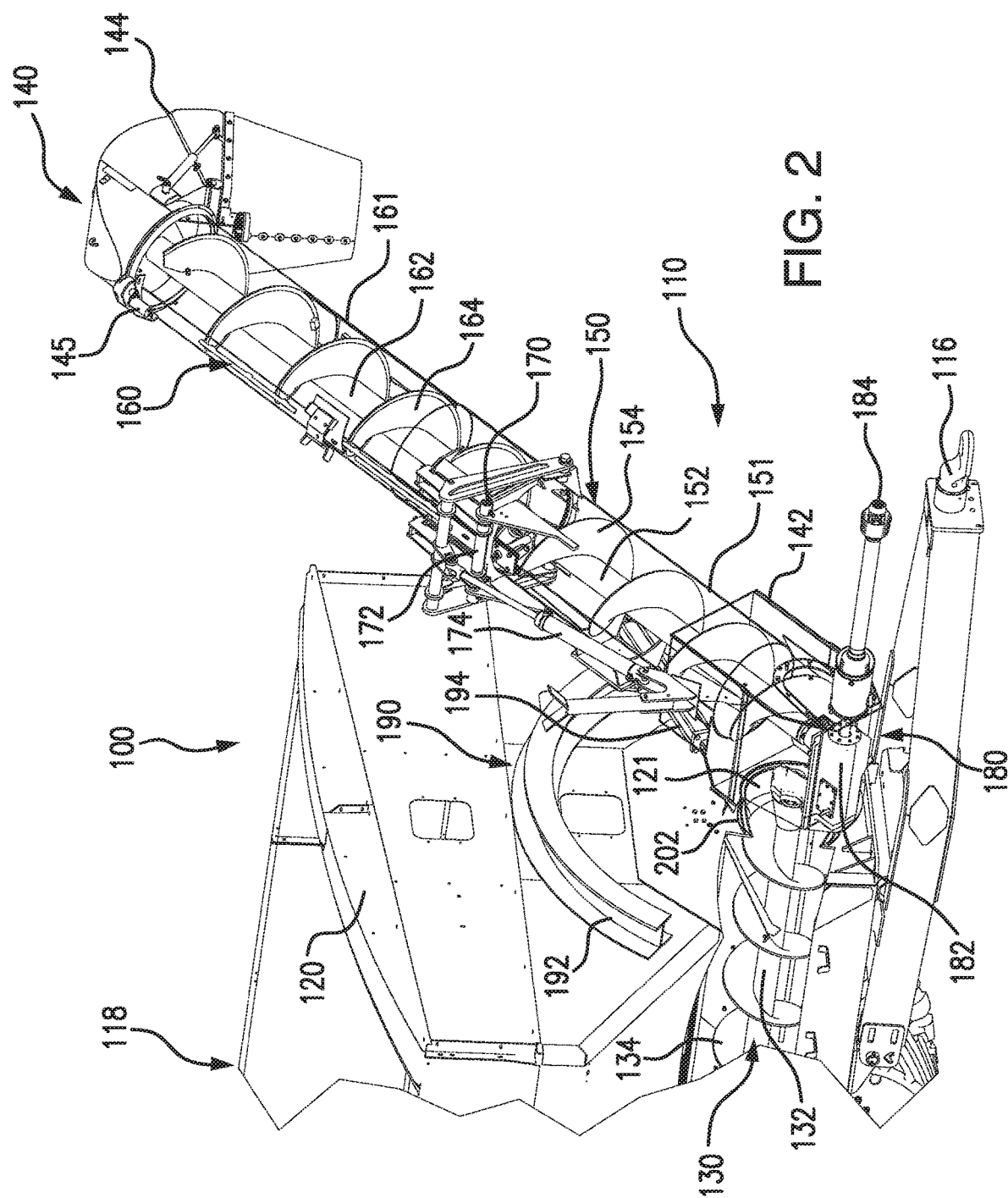
FIG. 2 is a detailed view of the dual auger assembly with the tubular housing depicted as transparent according to an exemplary embodiment.

The slide assembly 190 may further include a rotatable connection between the intake housing 142 and a housing extension of the horizontal auger assembly 130. For example, in some embodiments, as shown in FIG. 2, the front wall 120 includes an auger housing extension 202 projecting along the perimeter of the discharge opening 121 in an axial direction. In some embodiments, the auger housing extension 202 projects orthogonally with respect to the front wall 120.

In various embodiments, a transverse dimension (e.g., diameter) of the auger housing extension 202 is greater than a transverse dimension (e.g., diameter) of the horizontal auger flighting 134. In some embodiments, the transverse dimension of the auger housing extension 202 is about 1 to 2 inches greater than the transverse dimension of the horizontal auger flighting 134. In other embodiments, the transverse dimension of the auger housing extension 202 is at least 2 inches greater than the transverse dimension of the horizontal auger flighting 134 to increase higher grain flow into the intake housing 142 and decrease grain pressure around the drive assembly 180.

Figure 5:
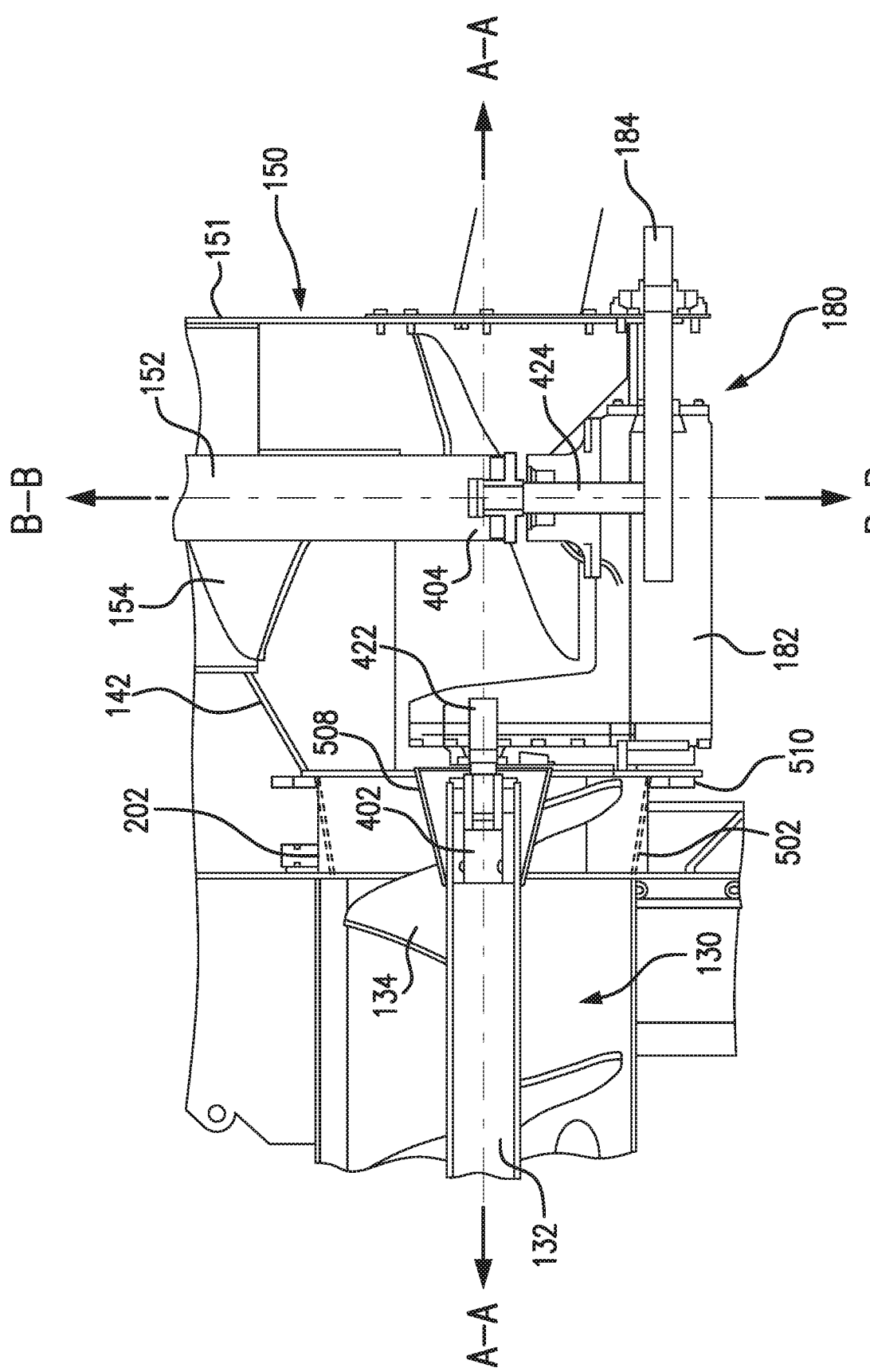
FIG. 5 is a detailed cross-sectional view of the dual auger assembly with the drive assembly according to an exemplary embodiment.

In other embodiments, an alternative housing extension 502 (indicated by dashed lines in FIG. 5) projects obliquely with respect to the front wall 120 such that the diameter of the discharge opening 121 increases as the housing extension 202 extends further away from the front wall 202. As shown in FIG. 5, the housing extension 502 comprises a tapered profile transitioning from a smaller diameter at about a first end proximate to the front wall 120 to a larger diameter at a distal end thereof. In some embodiments, the first end of the housing extension 502 may be about 20 inches, and the diameter of the second end of the housing extension 502 may range from about 22 to 24 inches.

In some non-limiting embodiments, the slide assembly 190 includes a pivot ring 510 disposed along a distal end of the auger housing extension 202 and rotatably engaged with the intake housing 142. The intake housing 142 is configured to rotatably connect with the auger housing extension 202 via the pivot ring 510 so that the intake housing 142 rotates about the auger housing extension 202 as the sliding actuator 194 slides the handle 450 extending from the lower housing 151 along the rail 192. The intake housing 142, along with the rest of the vertical auger assembly 140, pivots about axis A-A (as shown in FIG. 4) defined by lower auger shaft 132 when moving between the one or more operating positions along the first unloading range and one or more operating positions along the second unloading range. In other embodiments (not shown), the auger housing extension 202 projects from an end of the intake housing 142 and is rotatably coupled to the front wall 120, where the pivot ring 510 is disposed along the front wall 120 and rotatably engaged with the auger extension 202 of the intake housing 142.

Accordingly, the slide assembly 190 according to the present disclosure allows the dual auger assembly 110 to unload agricultural material held in the hopper 118 to storage containers or vehicles disposed on either side of the vehicle. The slide assembly 190 according to the present disclosure further allows the discharge height and reach in the lateral direction to be adjusted, thereby accommodating the discharge portion 144 to trailers of various heights.

In some embodiments, the vertical auger assembly 140 comprises an auger shaft coupling assembly 410 (shown in FIG. 4) disposed between the discharge end 406 of the lower auger shaft 152 and the intake end 408 of the upper auger shaft 162. The auger shaft coupling assembly 410 is configured to releasably connect the discharge end 406 of the lower auger shaft 152 to the intake end 408 of the upper auger shaft 162 when the vertical auger assembly 140 is set in an operating position. When the vertical auger assembly 140 is set in an operating position and the discharge end 406 of the lower auger shaft 152 is operatively connected to the intake end 408 of the upper auger shaft 162, the auger shaft coupling assembly 410 is configured to transmit torque applied from the lower auger shaft 152 to the upper auger shaft 162 such that the lower auger shaft 152 and the upper auger shaft 162 rotate together to convey agricultural material from the intake housing 142 to the discharge portion 144 of the vertical auger assembly 140. In some embodiments, the auger shaft coupling assembly 140 comprises a joint 412 configured to transmit rotation forces from the lower auger shaft 152 to the upper auger shaft 162. According to some embodiments of the present disclosure, the joint 412 is a universal joint (also known as a universal coupling, a U-joint, a Cardan joint, a Hardy-Spicer joint, or a Hooke's joint). However, any joint that allows the transfer of rotational motion through an angle may be acceptable.

The dual auger assembly 110 further includes a drive assembly 180. In embodiments, the drive assembly 180 is disposed in or around the intake housing 142 at the front of the grain cart 100. The drive assembly 180 is operatively connected to a power input device 184, which in some embodiments may be an input shaft configured to be driven by a power take off (PTO) shaft of a vehicle towing the grain cart 100. The drive assembly 180 is also operatively connected to the horizontal auger shaft 132 of the horizontal auger assembly 130, and the lower auger shaft 152 of the vertical auger assembly 140. The drive assembly 180 is configured to transmit torque (e.g., rotation) applied by the power input device 184 to both the horizontal auger shaft 132 and the lower auger shaft 152, such that the drive assembly 180 drives rotation of these auger shafts.

The power input device 184 may be releasably connected to the PTO shaft of a vehicle towing the grain cart 100 and is configured to transmit torque applied by the PTO to other components of the drive assembly 180. In some embodiments, referring for example to FIGS. 4-6, the drive assembly 180 includes a first drive member 422 operatively connected to a first end 402 of the horizontal auger shaft 132 to drive the horizontal auger shaft 132 and a second drive member 424 operatively connected to the intake end 404 of the lower auger shaft 152 to drive the lower auger shaft 152. The drive assembly may also include a casing 182 disposed in or near the intake housing 142 and enclosing all or part of the power input device 184, the first drive member 422, and the second drive member 424.

As shown in FIG. 4, the spatial arrangement of the first drive member 422 and the second drive member 424 with respect to the power input device 184 and the horizontal and lower auger shafts 132, 152 allows the longitudinal axes A-A and B-B of the horizontal and lower auger shafts 132, 152 to lie in the same plane (i.e., the longitudinal axes are coplanar). The spatial arrangement of the first drive member 422 and the second drive member 424 with respect to the power input device 184 and the horizontal and lower auger shafts 132, 152 further allows the lower auger flighting 154 to extend at least in part below the longitudinal axis A-A of the horizontal auger shaft 132. By allowing the horizontal and lower auger shafts 132, 152 to be coplanar and the lower auger flighting 154 to extend below the centerline of the horizontal auger shaft 132, the drive assembly 180 minimizes the substantially flighting-free space in the intake housing 142, thereby reducing the likelihood of agricultural material getting stuck or compressed at the junction between the horizontal and vertical auger assemblies 130, 140. Accordingly, the drive assembly 180 according to various embodiments described herein promotes substantially even distribution of agricultural material throughout the length of the dual auger assembly 110 and reduces grain compression around casing 182 of the drive assembly 180.

In some embodiments, as shown in FIG. 5, the horizontal auger shaft 132 may include a tapered skirt 508 disposed around the first end 402 of the horizontal auger shaft 132. The skirt 508 lies further away in the radial direction from the horizontal auger shaft 132 as the skirt 508 extends toward the first end 402. The shape of the skirt 508 deflects grain flow away from the first drive member 422 of the drive assembly 180, thereby reducing the likelihood of grain compressing around the casing 182 of the drive assembly 180. In other embodiments, grain flow may be deflected away from the casing 182 of the drive assembly by fastening a baffle plate (not shown) to an end of the casing 182 facing the opening 121, such that the baffle plate deflects incoming grain away from the casing 182. In other embodiments, the likelihood of grain compression around the casing 182 may be reduced by changing the pitch of a section of the horizontal auger flighting 134 proximate to the discharge opening 121. For example, the pitch of the section of the horizontal auger flighting 134 proximate to the discharge opening 121 may be set at a first pitch, and the remainder of the horizontal auger flighting 134 may be set a second pitch smaller than the first pitch. In some embodiments, the first pitch may be greater than the diameter of the auger flighting 134. The longer pitch of the horizontal auger flighting 134 proximate to the discharge opening 121 allows the grain flow mass to be carried further up the sides of the auger housing.

Figure 6:
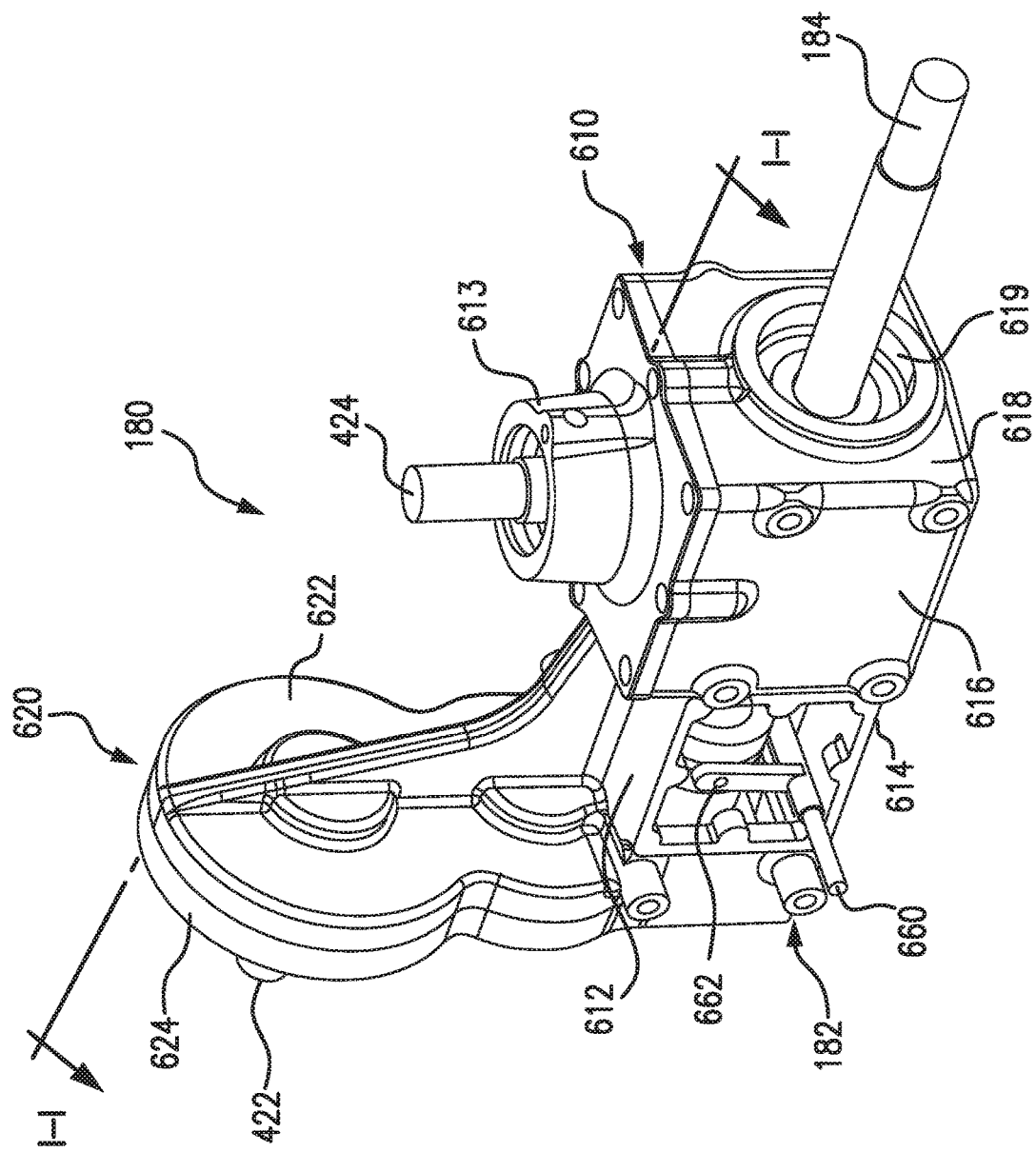
FIG. 6 is a perspective view of the drive assembly according to an exemplary embodiment.
Figure 7:
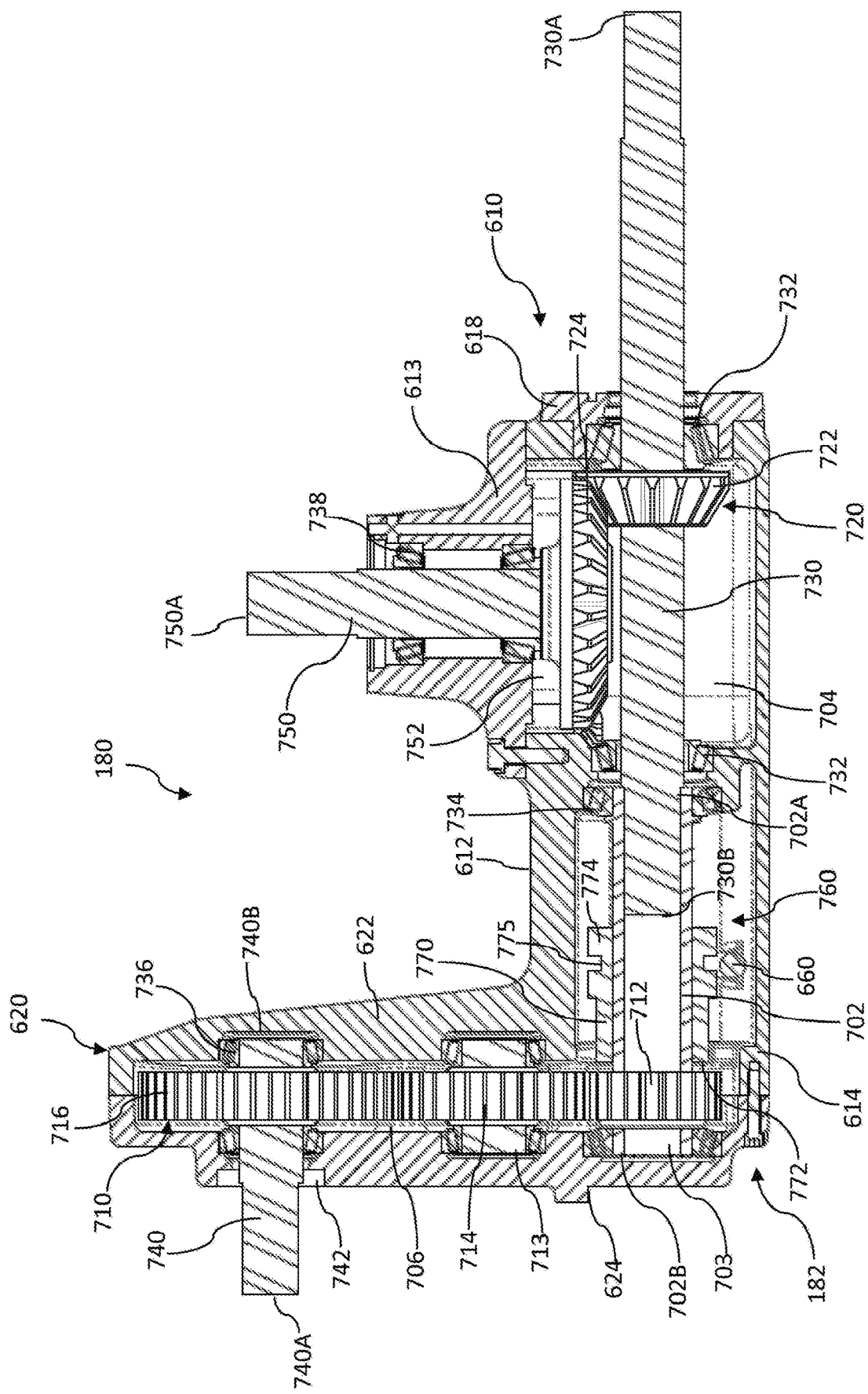
FIG. 7 is a cross-sectional view taken along line I-I in FIG. 6 of the drive assembly according to an exemplary embodiment.

Referring now to FIGS. 6 and 7, in accordance with a non-limiting embodiment, the casing 182 of the drive assembly 180 may include an elongated portion 610 and an upright portion 620. The elongated portion 610 includes a top wall 612, a bottom wall 614, one or more sidewalls 616, and a front wall 618 that together define a bore 704 extending through the elongated portion 610. The upright portion 620 includes a back wall 622 projecting from a back end of the top wall 612. The casing 182 further includes an end plate 624 fastened to the back wall 622 and the back end of the bottom wall 614 to define a cavity 706 that extends along the upright portion 620 and opens into the bore 704 of the elongated portion 610.

In some embodiments, the drive assembly 180 may include a transmission shaft 702 disposed in the casing 182 and coupled to the power input device 184 such that the transmission shaft 702 is configured to transmit torque applied by the power input device 184. Drive assembly 180 may further include a first gear assembly 710 operatively connecting the transmission shaft 702 to the first drive member 422 so that torque applied by power input device 184 is transmitted to the first drive member 422. Drive assembly 180 may additionally include a second gear assembly 720 operatively connecting the power input device 184 to the second drive member 424 so that torque applied by power input device 184 is transmitted to the second drive member 424. The drive assembly 180 may include a clutch assembly 760 operatively connected to the transmission shaft 702 and the first gear assembly 710 such that the clutch assembly 760 is configured to selectively engage or disengage torque transmission between transmission shaft 702 and the first gear assembly 710.

The power input device 184 may in some embodiments include an input shaft 730 configured to be driven by the PTO of the towing vehicle. The input shaft 730 includes a first end 730A disposed outside the casing 182 to engage the PTO and a second end 730B disposed inside the bore 704 to engage the transmission shaft 702, whereby the input shaft 730 extends through an opening 619 of the front wall 618 of the casing 182. A longitudinal axis of the power input device 184 (e.g., input shaft 730) may extend parallel with respect to the first drive member 422 (first drive shaft 740) and perpendicular or oblique with respect to the second drive member 424 (second drive shaft 750). The drive assembly 180 includes a first set of bearings 732 disposed in the elongated portion 610 of the casing 182 to rotatably support the input shaft 730 along the bore 704. In some embodiments, the first set of bearings 732 may include at least one of a ball bearing, a tapered roller bearing, a needle bearing, and a cylindrical roller bearing.

The transmission shaft 702 may be disposed in the bore 704 of the casing 182 proximate to the end plate 624. The transmission shaft 702 is axially aligned with respect to the input shaft 730, such that the transmission shaft 702 extends parallel with respect to the first drive member 422 (first drive shaft 740). In some embodiments, the transmission shaft 702 is tubular shaped and defines a passage 703 extending from a first open end 702A to a second open end 702B. The second end 730B of the input shaft 730 protrudes through the first open end 702A of the transmission shaft 702 and is received in the passage 703 of the transmission shaft 702. The input shaft 730 is pressed against an interior surface of the transmission shaft 702 such that the transmission shaft 702 rotates together with the input shaft 730. The drive assembly 180 includes a second set of bearings 734 disposed in the elongated portion 610 of the casing 182 to rotatably support the transmission shaft 702 along the bore 704. In some embodiments, the second set of bearings 734 may include at least one of a ball bearing, a tapered roller bearing, a needle bearing, and a cylindrical roller bearing.

In some embodiments, the first drive member 422 is a first drive shaft 740 rotatably coupled to directly engage the horizontal auger shaft 132. The first drive shaft 740 includes a first end 740A disposed outside the casing 182 to the horizontal auger shaft 132 and a second end 740B disposed inside the cavity 706, whereby the first drive shaft 740 extends through an opening 742 of the end plate 624 of the casing 182. The first drive shaft 740 is axially aligned with the longitudinal axis of the horizontal auger shaft 132. The drive assembly 180 includes a third set of bearings 736 disposed in the upright portion 620 of the casing 182 to rotatably support the first drive shaft 740 in the cavity 706. In some embodiments, the third set of bearings 736 may include at least one of a ball bearing, a tapered roller bearing, a needle bearing, and a cylindrical roller bearing.

The first gear assembly 710 extends substantially vertically along the cavity 706 of the casing 182 to operatively connect the first drive shaft 740 to the transmission shaft 702. In some embodiments, the first gear assembly 710 includes a first spur gear 712 disposed in the bore 704 and received around the transmission shaft 702. In some embodiments, the first gear assembly 710 includes a hub shaft 713 rotatably supported in the cavity 706 of the upright portion 620 of the casing 182, a second spur gear 714 received around the hub shaft 713, and a third spur gear 716 received around the first drive shaft 740 in the cavity 706. The first, second, and third spur gears 712, 714, and 716 are substantially aligned in a vertical direction between the transmission shaft 702 and the first drive shaft 740. The first spur gear 712 is configured to transmit torque applied by the transmission shaft 702 to the second spur gear 714, which is configured to transmit the applied torque to the third spur gear 716 to drive rotation of the first drive shaft 740. In some embodiments, the first gear assembly 710 is configured to reduce the rotational velocity applied from the transmission shaft to the first drive shaft 740 by setting the diameter of the third spur gear 716 larger than the diameter of the first spur gear 712.

In some embodiments, the clutch assembly 760 includes a clutch tube 770 disposed in the bore 704 of the casing 182 and proximate to the first spur gear 712. The clutch tube 770 is received around the transmission shaft 702. The clutch tube 770 includes spline (not shown) disposed along the interior surface that mates with spline (not shown) disposed along the exterior surface of the transmission shaft 702, such that the clutch tube 770 is configured to rotate with the transmission shaft 702. The clutch tube 770 includes one or more cogs 772 disposed at a first end of the clutch tube 770, a pair of projections 774 disposed proximate to a second end of the clutch tube 770, and a recess surface 775 defined between the pair of projections 774. In some embodiments, the first spur gear 712 includes recesses (not shown) disposed on a face (not shown) of the first spur gear 712 and configured to receive a respective cog 772 of the clutch tube 770. The clutch tube 770 is configured to slide along the transmission shaft 702 in an axial direction between a disengaged position, where the cogs 772 are spatially separated from the first spur gear 712, and an engaged position, where the cogs 772 are received in the recesses of the first spur gear 712 so that the clutch tube 770 transmits torque applied from the transmission shaft 702 to the first spur gear 712. In some embodiments, the clutch tube 770 is biased towards the first spur gear 712 (e.g., by a spring) to be set in the engaged position.

Referring to FIGS. 6 and 7, in some embodiments, the clutch assembly 760 includes an actuator shaft 660 extending transverse with respect to the axis of the clutch tube 770 and projecting through at least one of the sidewalls 616 of the casing 182. In various embodiments, the actuator shaft 660 is configured to move or rotate between two or more positions to trigger movement of the clutch tube 770 between the engaged and the disengaged positions. In some embodiments, as shown in FIG. 6, the actuator shaft 660 includes a fork 662 connected to the recessed surface 775 of the clutch tube 770 to actuate movement of the clutch tube 770 between the disengaged and engaged positions. The actuator shaft 660 is configured to rotate about an axis transverse to the longitudinal axis of the clutch tube 770 between a meshed position, where the cogs 772 of the clutch tube 770 are set in the engaged position, and a release position, where the cogs 772 of the clutch tube 770 are set in the disengaged position.

In some embodiments, the actuator shaft 660 is driven by a clutch hydraulic cylinder operatively connected to a hydraulic assembly (not shown) configured to selectively actuate movement of the actuator shaft 660. When set at the release position, the fork 662 of the actuator shaft 660 impedes the clutch tube 770 from sliding toward the first spur gear 712, such that the clutch tube 770 remains in the disengaged position. To move the clutch tube 770 to the engaged position, the actuator shaft 660 may rotate in a first direction (e.g., counterclockwise) toward the meshed position. As the actuator shaft 660 rotates to the meshed position, the rotation of the fork 662 translates into linear movement of the clutch tube 770 in axial direction toward the first spur gear 712, thereby allowing the spring biased cogs 772 to reach the engaged position. To return the clutch tube 770 back to the disengaged position, the actuator shaft 660 rotates in a second direction (e.g., clockwise) toward the release position. As the actuator shaft 660 rotates to the release position, the rotation of the fork 662 translates into linear movement of the clutch tube 770 in axial direction away from the first spur gear 712, overcoming the spring bias of the clutch tube 770. When the actuator shaft 660 reaches the release position, the cogs 772 are spatially separated from the first spur gear 712, and the fork 662 of the actuator shaft 660 impedes the spring-biased clutch tube 770 from sliding back to the first spur gear 712.

In some embodiments, the clutch assembly 760 may be configured to control the amount of torque transmitted to the first gear assembly 710, and ultimately, the first drive shaft 740. For example, the cogs 772 of the clutch tube 770 and the recesses of the first spur gear 712 may include tapered sections, which in combination with the spring bias of the clutch tube 770 allow the cogs 772 to disengage from the first spur gear 712 when the transmitted torque exceeds a predetermined maximum operation torque. In some embodiments, the clutch assembly 760 may include a clutch tube (not shown) disposed on the first drive shaft 740 and the first drive member 402 to control the amount of torque transmitted from the drive assembly 180 to the horizontal auger shaft 132.

In some embodiments, the second drive member 424 is a second drive shaft 750 rotatably coupled directly to the lower auger shaft 152. The second drive shaft 750 includes a first end 750A disposed outside the casing 182 to engage the lower auger shaft 152 and a second end (not shown) disposed inside the bore 704, whereby the second drive shaft 750 extends through an opening 752 of the top wall 612 of the casing 182. The second drive shaft 750 is axially aligned with the longitudinal axis of the lower auger shaft 152. The casing 182 further includes a ferrule 613 connected to the top wall 612 and disposed around the second drive shaft 750, whereby the ferrule 613 encloses the opening 752 and shields a portion of the second drive shaft 750. The drive assembly 180 includes a fourth set of bearings 738 disposed in the ferrule 613 to rotatably support the second drive shaft 750. In some embodiments, the fourth set of bearings 738 may include at least one of a ball bearing, a tapered roller bearing, a needle bearing, and a cylindrical roller bearing.

The second gear assembly 720 is disposed in the bore 704 of the casing 182 to operatively connect the second drive shaft 750 to the input shaft 730. In some embodiments, the second gear assembly 720 includes a first bevel gear 722 disposed proximate to the front wall 618 and received around the input shaft 730 in the bore 704. In some embodiments, the second gear assembly 720 includes a second bevel gear 724 disposed proximate to or in the opening 752 of the top wall 612 and received around the second end of the second drive shaft 750. As shown in FIG. 7, the second bevel gear 724 is oriented perpendicular with respect to the first bevel gear 722, and the second bevel gear 724 rotatably engages the first bevel gear 722. The first bevel gear 722 is configured to transmit torque applied by the input shaft 730 to the second bevel gear 724, to drive rotation of the second drive shaft 750. In some embodiments, the second gear assembly 720 is configured to reduce the rotational velocity applied from the input shaft 730 to the second drive shaft 750 by setting the diameter of the second bevel gear 724 larger than the diameter of the first bevel gear 722.

Figure 8:
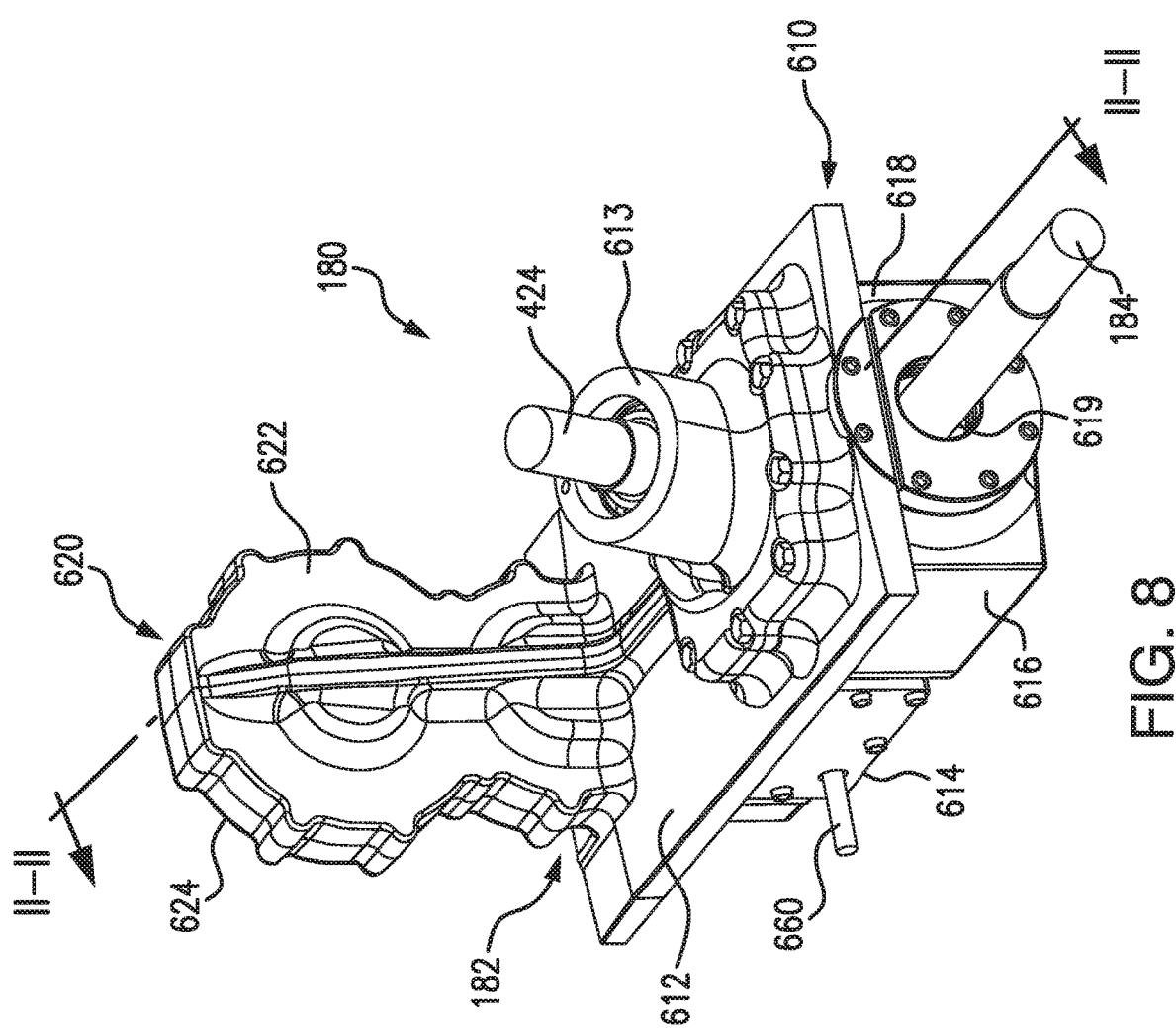
FIG. 8 is a perspective view of the drive assembly according to an exemplary embodiment.
Figure 9:
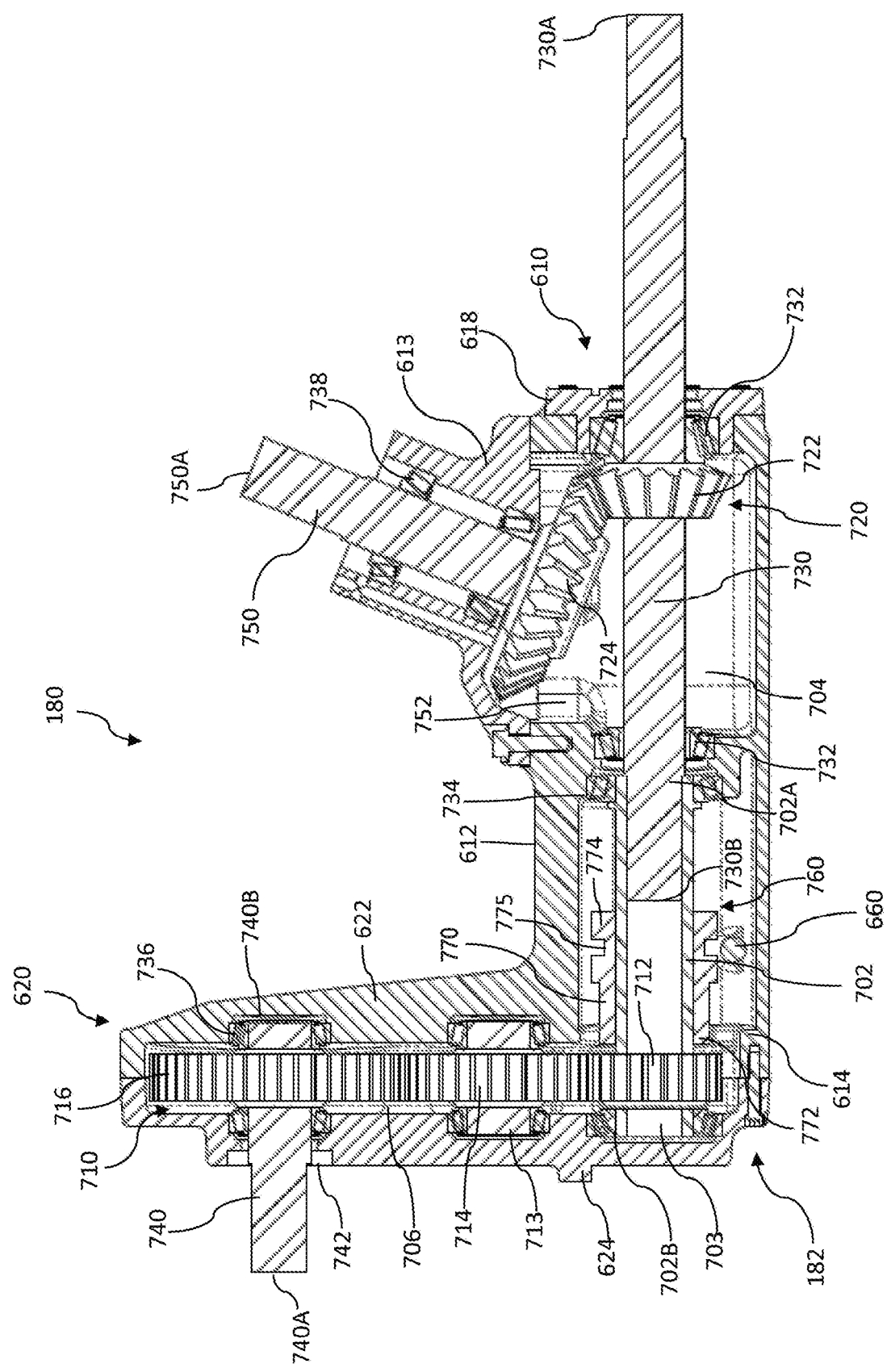
FIG. 9 is a cross-sectional view taken along line II-II in FIG. 8 of the drive assembly according to an exemplary embodiment.

As shown in FIGS. 6 and 7, the longitudinal axis of the second drive shaft 750 extends perpendicularly (or substantially perpendicularly) with respect to the longitudinal axis of the input shaft 730. However, in other non-limiting embodiments, as shown in FIGS. 8 and 9, the longitudinal axis of the second drive shaft 750 may extend obliquely with respect to the longitudinal axis of the input shaft 730, so that the longitudinal axis of the vertical auger assembly 180 extends at an oblique angle with respect to the longitudinal axis of the horizontal auger assembly 130. The embodiments shown in FIGS. 8 and 9, where the second drive shaft 750 extends obliquely with respect to the input shaft 730, show that the drive assembly 180 includes substantially the same features as described in the embodiments shown in FIGS. 6 and 7. Where the same reference numeral is used in the figures, the description from FIGS. 6-7 also applies to FIGS. 8-9. The difference between the embodiments is that the second bevel gear 724 is oriented obliquely with respect to the first bevel gear 722 and the ferrule 613 is shaped to correspond to the orientation of the second drive shaft 750. Allowing the second drive shaft 750 to extent obliquely in this manner supports grain carts having a vertical auger that is similarly angled, and can therefore improve the forward and/or side reach of the vertical auger with respect to the walls of the hopper of the grain cart.

In some embodiments, as shown in FIGS. 4 and 5, the casing 182 of the drive assembly 180 may be entirely disposed within the intake housing 142, where the upright portion 620 of the casing 182 is disposed proximate to the discharge opening 121 at the end of the housing extension 201. In other embodiments (not shown), the casing 182 of the drive assembly 180 may extend through the discharge opening 121 at the end of the housing extension 201, where the upright portion 620 of the casing 182 is disposed in the housing extension 201. In such embodiments, the pivot ring 510 may be positioned along the front wall 120 of the hopper 118, rather than at the end of the housing extension 201.

While the embodiment of the drive assembly 180 shown in FIGS. 1-9 includes a single casing 182 that encloses or partially encloses the power input device 184, the first drive member 422, and the second drive member 424, the drive assembly 180 in alternative embodiments may include two or more gearboxes disposed in the intake housing 142 and operatively connected the power input device 184, the first drive member 422, and the second drive member 424, whereby the longitudinal axes of the horizontal and lower auger shafts 132, 152 lie in the same plane and the lower auger flighting 154 extends below the centerline of the horizontal auger shaft 132.

Figure 10:
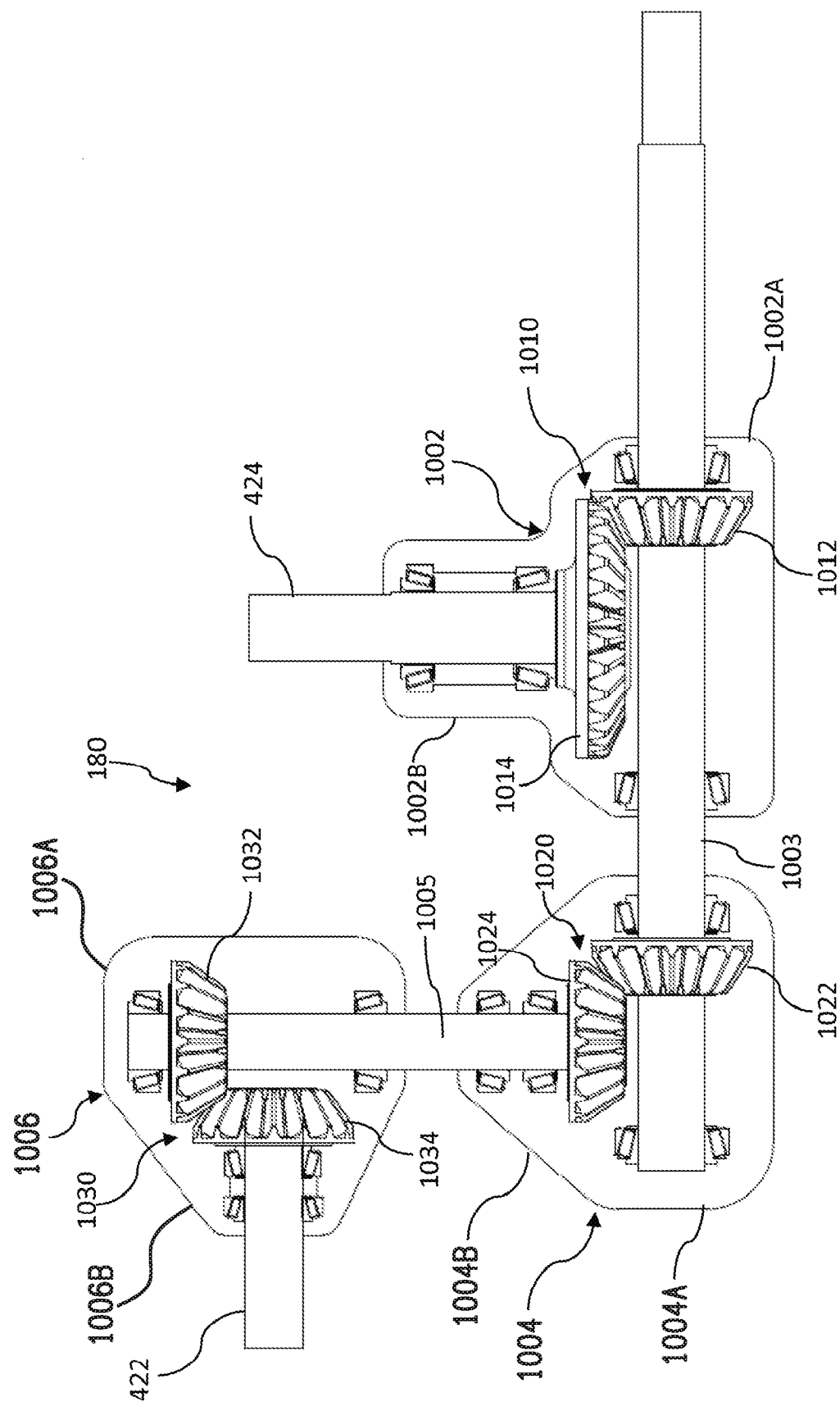
FIG. 10 is a schematic cross-sectional view of a drive assembly according to an exemplary embodiment.

For example, in the non-limiting embodiment shown in FIG. 10, the drive assembly 180 may include a first gearbox 1002 that includes an elongated portion 1002A, an upright portion 1002B, and a first bevel gear assembly 1010 disposed in the first gear box 1002 and operatively connecting the power input device 184 (shown in FIG. 1) to the second drive member 424. The drive assembly 180 may include a second gearbox 1004 that includes an elongated portion 1004A substantially aligned with respect to the elongated portion 1002A of the first gearbox 1002 and an upright portion 1004B extending in away from the elongated portion. The drive assembly 180 may include a first transmission shaft 1003 operatively connecting the power input device 184 at the first gearbox 1002 to the elongated portion of the second gearbox 1004. The first gearbox 1002 operatively connects the power input device 184 to the first transmission shaft 1003 so that torque is transmitted from the power input device 184 to the first transmission shaft 1003.

In some embodiments, the first bevel gear assembly 1010 includes a first bevel gear 1012 disposed in the elongated portion 1002A of the first gear box 1002 and received around the first transmission shaft 1003. In some embodiments, the first bevel gear assembly 1010 includes a second bevel gear 1014 disposed proximate to the upright portion 1002B and received around an end of the second drive member 424. As shown in FIG. 10, the second bevel gear 1014 is oriented perpendicular with respect to the first bevel gear 1012, and the second bevel gear 1014 rotatably engages the first bevel gear 1012. The first bevel gear 1012 is configured to transmit torque applied by the first transmission shaft 1003 to the second bevel gear 1012, to drive rotation of the second drive member 424.

The drive assembly 180 may include a third gearbox 1006 disposed above the upright portion 1004B of the second gearbox 1004. The third gearbox 1006 may include an upright portion 1006A substantially aligned with the upright portion 1004B of the second gearbox 1004 and an elongated portion 1006B substantially aligned with the horizontal auger shaft 132 (shown in FIG. 1). The drive assembly 180 may include a second transmission shaft 1005 operatively connected to the upright portions 1004B, 1006A of the second and third gearboxes 1004, 1006. The second gearbox 1004 may include a second bevel gear assembly 1020 operatively connecting the first and second transmission shafts 1003, 1005 so that torque is transmitted from the first transmission shaft 1003 to the second transmissions shaft 1005. The third gearbox 1006 may include a third bevel gear assembly 1030 operatively connecting the second transmission shaft 1005 to the first drive member 422 so that torque is transmitted from the second transmission shaft 1005 to the first drive member 422, and ultimately, the horizontal auger shaft 132.

In some embodiments, the second bevel gear assembly 1020 includes a first bevel gear 1022 disposed in the elongated portion 1004A of the second gear box 1004 and received around the first transmission shaft 1003. In some embodiments, the second bevel gear assembly 1020 includes a second bevel gear 1024 disposed proximate to the upright portion 1004B and received around an end of the second transmission shaft 1005. As shown in FIG. 10, the second bevel gear 1024 is oriented perpendicular with respect to the first bevel gear 1022, and the second bevel gear 1024 rotatably engages the first bevel gear 1022. The first bevel gear 1022 is configured to transmit torque applied by the first transmission shaft 1003 to the second bevel gear 1024, to drive rotation of the second transmission shaft 1005.

In some embodiments, the third bevel gear assembly 1030 includes a first bevel gear 1032 disposed in the upright portion 1006A of the third gear box 1006 and received around the second transmission shaft 1005. In some embodiments, the second bevel gear assembly 1030 includes a second bevel gear 1034 disposed proximate to the elongated portion 1006B and received around an end of the first drive member 422. As shown in FIG. 10, the second bevel gear 1034 is oriented perpendicular with respect to the first bevel gear 1032, and the second bevel gear 1034 rotatably engages the first bevel gear 1032. The first bevel gear 1032 is configured to transmit torque applied by the second transmission shaft 1005 to the second bevel gear 1032, to drive rotation of the first drive member 422, and ultimately, the horizontal auger shaft 132.

In some embodiments, the first gear assembly 1010 is configured to reduce the rotational velocity applied from the power input device 184 to the second drive member 424 by selecting a predetermined gear ratio between the first and second bevel gears 1012, 1014. In one embodiment, the first gear assembly 1010 may reduce the rotational velocity applied from the power input device 184 to the second drive member 424 in half by setting the diameter of the second bevel gear 1014 twice as large as the diameter of the first bevel gear 1012.

In some embodiments, the second gear assembly 1020 is configured to reduce the rotational velocity applied from the first transmission shaft 1003 to the second transmission shaft 1005 by selecting a predetermined gear ratio between the first and second bevel gears 1022, 1024. In one embodiment, the second gear assembly 1020 may reduce the rotational velocity applied from the first transmission shaft 1003 to the second transmission shaft 1005 in half by setting the diameter of the second bevel gear 1024 twice as large as the diameter of the first bevel gear 1022.

In some embodiments, the third gear assembly 1030 is configured to reduce the rotational velocity applied from the second transmission shaft 1005 to the first drive member 422 by selecting a predetermined gear ratio between the first and second bevel gears 1032, 1034. In one embodiment, the third gear assembly 1030 may reduce the rotational velocity applied from the second transmission shaft 1005 to the first drive member 422 in half by setting the diameter of the second bevel gear 1034 twice as large as the diameter of the first bevel gear 1032.

In some embodiments, the second gear assembly 1020 is configured to reduce the rotational velocity applied from the first transmission shaft 1003 to the second transmission shaft 1005, while the third gear assembly 1030 is configured to maintain the same rotational velocity applied from the second transmission shaft 1005 to the first drive member 422. In some embodiments, the second gear assembly 1020 is configured to maintain the same rotational velocity applied from the first transmission shaft 1003 to the second transmission shaft 1005, while the third gear assembly 1030 is configured to reduce the rotational velocity applied from the second transmission shaft 1005 to the first drive member 422.

Figure 12:
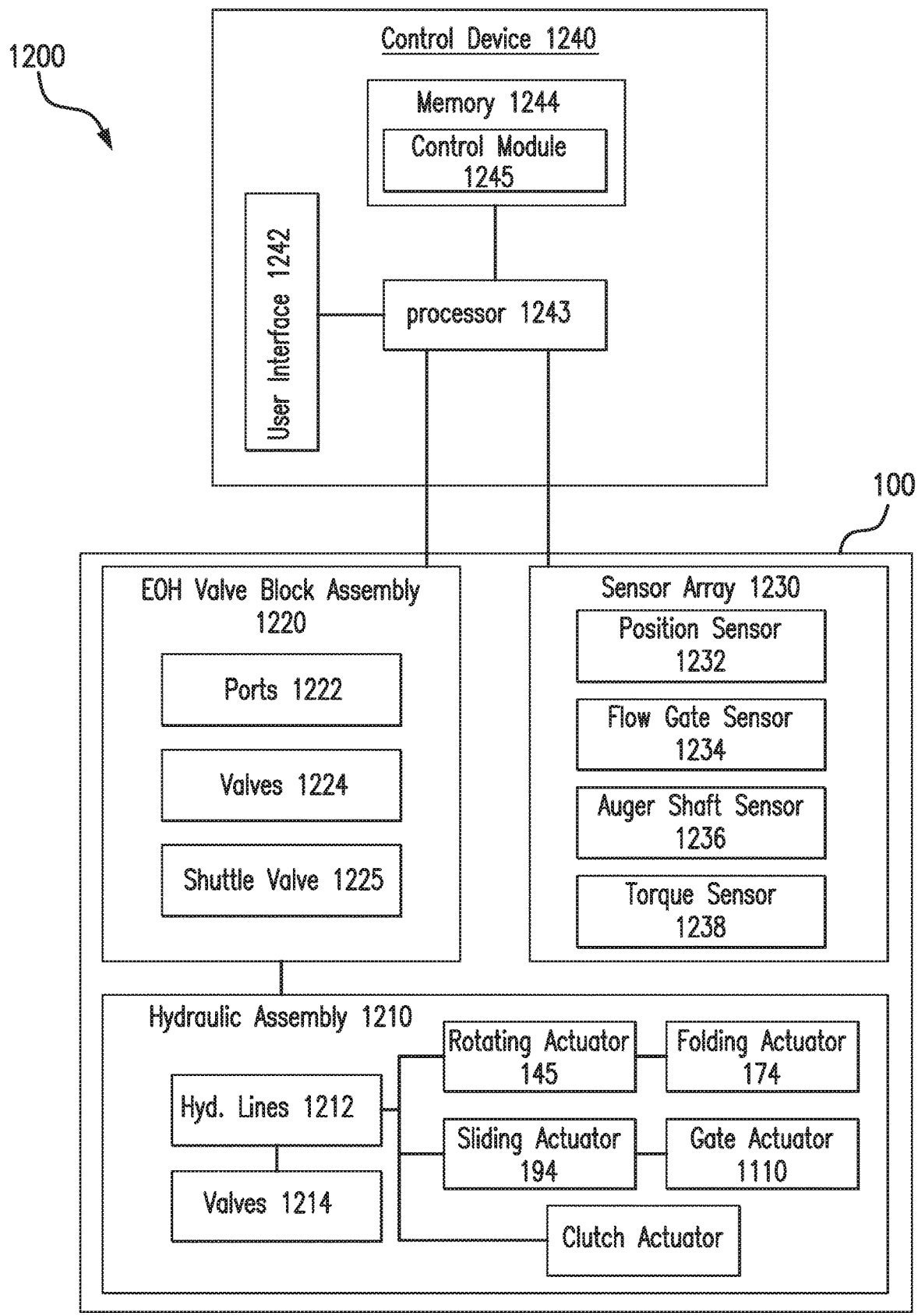
FIG. 12 is a schematic drawing of the control system for the grain cart hydraulic assembly according to an exemplary embodiment.

In some embodiments, as shown in FIG. 12, a control system 1200 may be provided to interact with the grain cart 100 and a vehicle (not shown) towing the grain cart 100. The control system 1200 may include a grain cart hydraulic assembly 1210, an electric over hydraulic (EOH) valve block assembly 1220, a sensor array 1230, and a control device 1240. The control system 1200 allows a user to selectively control movement of the various components of the dual auger assembly 110 and automate functions of the grain cart 100.

The grain cart hydraulic assembly 1210 includes a plurality of hydraulic lines 1212 disposed on the grain cart 100 and fluidly connecting various actuators, such as, for example, the rotating actuator 145, the folding actuator 174, the sliding actuator 194, the clutch actuator associated with the actuator shaft 660, and the flow gate actuator 1110, to the EOH valve block assembly 1220. The hydraulic assembly 1210 may include one or more valves 1214, such as, for example, a check valve, to ensure proper fluid flow to the various actuators disposed on the grain cart 100.

The EOH valve block assembly 1220 is disposed on the grain cart 100 and includes a plurality of ports 1222 that fluidly connect the hydraulic assembly of the towing vehicle with the grain cart hydraulic assembly 1210. The EOH valve block assembly 1220 includes a plurality of valves 1224 (e.g., electromagnetic-actuated multiple-positions shuttle cartridges) that control the supply of hydraulic fluid to the various actuators to actuate or stop movement of the vertical auger assembly 140, the clutch assembly 760, and other grain cart related functions. In some embodiments, the plurality of valves 1224 may include a shuttle valve 1225 configured to stop fluid communication between the vehicle and the hydraulic assembly 120 such that hydraulic fluid from the vehicle is cut off beyond the EOH valve bock assembly 1220.

The sensor array 1230 may include one or more vertical auger position sensors 1232 for monitoring a position of the vertical auger assembly 140 as the vertical auger assembly 140 pivots between one or more operating positions along the first and second unloading ranges 320 and 330. In some embodiments, the one or more vertical auger position sensors 1232 may include a position sensor disposed in the sliding actuator 194 or a position sensor disposed on the handle 450 connected to the rail 190 of the slide assembly 190. The sensor array 1230 may include a flow gate sensor 1234 disposed in the hopper 118 and configured to monitor the position of the flow gate assembly 1102. The sensor array 1230 may include an auger shaft sensor 1236. In some embodiments, the auger shaft sensor 1236 is disposed in the housing 151 of the lower auger section 150 and configured to measure the rotational speed of the lower auger shaft 152 or the torque applied by the lower auger shaft 152.

The control device 1240 may be a handheld device (e.g., tablet) or may be built-in or mounted to the towing vehicle or grain cart 100. In various embodiments, the control device 1240 is in communication with the sensor array 1230 and the EOH valve block assembly 1220. In some embodiments, the control device 1240 is operatively connected to the EOH valve block assembly 1220 and the sensor array 1230 by a set of wires and communicates with the sensor array 1230 and the EOH valve block assembly 1220 using wired communication. Alternatively, in other embodiments, the control device 1240 may communicate with sensor array 1230 and EOH valve block assembly 1220 using wireless communication. The control device 1240 may include a user interface 1242, such as, for example, transducer buttons or a touch screen, etc., to allow an operator to input commands to the grain cart 100. The user interface 1242 may include auxiliary components, such as a joystick, a keyboard, or a display operatively connected to the control device 1240. The control device 1240 may include a processor 1243 and a memory 1244, in which the processor 1243 is configured to execute one or more modules stored in the memory 1244 and implement various functionalities of the grain cart 100. The memory 1244 may include volatile memory (e.g., RAM) and non-volatile memory (e.g., ROM). In some embodiments, the control device 1240 may include a control module 1245 stored in the memory 1244. The control module 1245 may allow the processor 1243 to execute various functions, including, for example, manage inputs from the user interface 1242 and the sensor array 1230, transmit commands, either automatically or manually, to the EOH valve block assembly 1220, and determine whether components (e.g., vertical auger assembly 140) of the grain cart 100 satisfy or deviate from a particular condition after receiving one or more input signals from the sensor array 1230.

In some embodiments, the control system 1200 is configured to monitor the location of the vertical auger assembly 140 when set in an operating position and configured to prevent or allow the upper auger section 160 to fold to the transport position. In operation, the control device 1240 receives an input signal from the one or more position sensors 1232 indicating a location of the vertical auger assembly 140 when set at the operating position. The control device 1240 uses the processor 1243 with the control module 1245 to determine whether the location of the vertical auger assembly 140 satisfies a condition to undergo a fold operation, in which the upper auger section 160 pivots from the operating position to the transport position, based on the input signal from the one or more position sensors 1232. In some embodiments, the condition is based on whether the fold operation would cause damage to the vertical auger assembly 140 by the upper auger section 160 hitting, for example, the ground or a vehicle located adjacent to a side of the grain cart 100. When the operator inputs a fold command via the user interface 1242 and if the location of the vertical auger assembly 140 satisfies the condition, the control device 1240 transmits a fold operation command to the EOH valve block assembly 1220 so that the folding actuator 174 pivots the upper auger section 160 to the transport position. Additionally, if the operator inputs a fold command via the user interface 1242 when the location of the vertical auger assembly 140 does not satisfy the condition, the control device 1240 does not transmit a fold operation command to the EOH valve block assembly 1220. Furthermore, the control device 1240 may be configured to display a feedback message to the operator through the user interface 1242. In some embodiments, the feedback message may indicate a warning that the vertical auger assembly 140 cannot undergo the fold operation.

In some embodiments, the control system 1200 is configured to monitor the location of the vertical auger assembly 140 and control the position of the flow gate assembly 1102 based on the location of the vertical auger assembly 140. In operation, the control device 1240 receives an input signal from the one or more position sensors 1232 indicating a location of the vertical auger assembly 140 when set at the operating position. The control device 1240 uses the processor 1243 with the control module 1245 to determine whether the location of the vertical auger assembly 140 is disposed along a predetermined non-loading range 340 based on the input signal from the one or more position sensors 1232. In some embodiments, the vertical auger assembly 140 may be oriented substantially upright with respect to the ground when set at an operation position along the non-loading range 340. If the processor 1243 determines that the location of the vertical auger assembly is along the non-loading range 340, the control device 1240 transmits a close command to the EOH hydraulic valve block assembly 1220 so that the flow gate actuator 1110 moves the second plate 1106 to the closed position. Alternatively, the control device 1240 may prevent a command signal from being sent to the one of the plurality of valves 1224 in the EOH valve block assembly 1220 that controls the flow gate actuator 1110.

In some embodiments, the control system 1200 is configured to automatically move the vertical auger assembly 140 between one or more operation positions disposed along the first and second unloading ranges 320 and 340. In operation, a user may use the user interface 1242 of the control device 1240 to set a predetermined operating position for the vertical auger assembly 140 and a predetermined position for the discharge portion 144. In some embodiments, the user interface 1242 allows the user to input an automatic position command so that the control device 1240 actuates the EOH valve block assembly 1220 to move the vertical auger assembly 140. When receiving the automatic position command as input from the user interface 1242, the control device 1240 transmits a command to the EOH valve block assembly 1220 to move the auger assembly 140 to the predetermined operating position and the discharge portion 144 to the predetermined position. In some embodiments, a user may set multiple predestined operating positions for the vertical auger assembly 140, including a first predetermined operating position disposed in the first unloading range 320 and a second predetermined operating position disposed in the second unloading range 330. The user interface 1242 may allow a user to input various automatic position commands, with each automatic position command corresponding to a respective predetermined operating position.

In some embodiments, the control system 1200 is configured to automatically move the vertical auger assembly 140 between operating and transport positions. In some embodiments, the user interface 1242 allows the user to input a fold command or an unfold command so that the control device 1240 actuates the EOH valve block assembly 1220 to fold or unfold the vertical auger assembly 140 between the operating and transport positions. When receiving a fold command as input from the user interface 1242, the control device 1240 transmits a command to the EOH valve block assembly 1220 to pivot the upper auger section 160 of the vertical auger assembly 140 from the operating position to the transport position. When receiving an unfold command as input from the user interface 1242, the control device 1240 transmits a command to the EOH valve block assembly 1220 to pivot the upper auger section 160 of the vertical auger assembly 140 from the transport position to the operating position.

In some embodiments, the control system 1200 allows the control device 1240 to actuate multiple functions of the vertical auger assembly 140, such as unfolding the upper auger section 160, positioning the vertical auger assembly 140, and rotating the discharge portion 144, in a single user selection of the user interface 1242. For example, when an operator inputs a command via the user interface 1242 to move the vertical auger assembly 140 to the second unloading range 330, the processor 1243 of the control device 1240 may recognize based on input signals from the sensor array 1230 that the vertical auger assembly 140 is set in the transport position. Accordingly, the control device 1240 may, in sequence: (i) actuate movement of the upper auger section 160 to an in-line operation position, (ii) actuate movement of the vertical auger assembly 140 to an operation position along the second unloading range 330, and (iii) actuate rotation of the discharge portion 144 to a position where the discharge portion 144 faces away from the grain cart 100. Furthermore, the operator may input a predefined transport position command via the user interface 1242 such that the control device 1240 may in sequence: (i) actuate movement of the vertical auger assembly 140 from the second unloading range 330 to the first unloading range 320, (ii) actuate rotation of the discharge portion 144 to an appropriate position for folding the upper auger section 160 (if needed), and (iii) actuate the fold operation of the upper auger section 160 to pivot from an operation position to the transportation position. In another example, when the vertical auger assembly is set in the transport position, the user interface 1242 allows the user to input the automatic position command so that the control device 1240 actuates the EOH valve block assembly 1220 to pivot the upper auger section 160 from the transport position to the operating position and move the vertical auger assembly 140 to the predetermined operation position.

In some embodiments, the control system 1200 allows the control device 1240 to actuate movement of the actuator shaft 660 between the meshed and release positions to control the operation of the horizontal auger assembly 130. The control device 1240 using the processor 1243 with the control module 1245 may actuate the actuator shaft 660 to move from the meshed position to the release position when the torque applied from the vertical auger assembly 140 to the horizontal auger assembly 130 exceeds a predetermined maximum torque. The control device 1240 using the processor 1243 with the control module 1245 may actuate the flow gate actuator 1110 to move the first and second plates to the closed position when the torque applied from the vertical auger assembly 140 to the horizontal auger assembly 130 exceeds a predetermined maximum torque.

In some embodiments, the control system 1200 allows the control device 1240 to actuate movement of the actuator shaft 660 between the meshed and release positions to control the operation of the horizontal auger assembly 130 when directed by the operator. In operation, the operator may set the control device 1240 to actuate rotation of the actuator shaft 660 from the meshed position to the release position when the torque applied by the drive assembly 180 has exceeded a predetermined torque limit. In some embodiments, the torque applied by the drive assembly 180 may exceed the predetermined torque limit if the dual auger assembly 110 is overfilled with grain. Additionally, in response to the operator inputting a command to move the actuate shaft 660 to the release position, the control device 1200 may actuate movement of the second plate 1106 of the flow gate assembly 1102 to the closed position to prevent more grain from entering the horizontal auger assembly 130. Once the actuator shaft 660 is set in the release position, all the torque applied by the drive assembly 180 can be transmitted to the vertical auger assembly 140 to unload the grain load remaining in the vertical auger assembly 140. Then, the operator may use the control device 1240 to actuate the movement of the actuator shaft 660 to the meshed position so that the drive assembly 180 transmits torque to both the vertical auger assembly 140 and the horizontal auger assembly 130. Accordingly, the vertical auger assembly 140 uses a low amount of operating torque with no grain load at startup, thereby allowing the majority of the torque applied by the drive assembly 180 to be transmitted to the horizontal auger assembly 130 during the startup operation to overcome the grain load.

In some embodiments, the sensor array 1230 may include at least one torque or rotational speed (e.g. RPM) sensor 1238 monitoring the torque applied by or rotational speed of at least one of the power input device 184, the lower auger shaft 152, and the horizontal auger shaft 132. In some embodiments, the control device 1240 is configured to receive an input signal from the torque or rotational speed sensor 1238 indicating the measured torque applied by or rotational speed of at least one of the power input device 184, the lower auger shaft 152, and the horizontal auger shaft 132. The control device 1240 may be configured to adjust grain flow to the horizontal auger assembly 130 by actuating movement of second plate 1106 of the flow gate assembly 1102, via the flow gate actuator 1110, based on the input signal from the torque or rotational speed sensor 1238. The control device 1240 may increase grain flow in response to input signals indicating low torque or high RPM values. The control device 1240 may decrease the grain flow in response to input signals indicating high torque or low RPM values.

While grain cart 100 is capable of unloading on either the left-hand side or right-hand side of the grain cart, the drive assembly 180 herein described is also capable of being used in grain carts that are able to unload only on the left-hand side, or only on the right-hand side, of a grain cart. The drive assembly 180 is also capable of being used in grain carts where the vertical auger is located at a corner of the grain cart, such as a front corner, or where the vertical auger is located on a side other than the front side of a grain cart.

Dual auger grain carts are described in in U.S. Patent Publication No. 2017/0290270, entitled "Dual Auger Grain Cart with adjustable forward reach", the content of which are herein incorporated in their entirety. The disclosures therein related to dual auger grain carts, and specifically to horizontal and vertical augers, are applicable to grain carts of embodiments herein described.

Track propulsion systems for grain carts are described in U.S. Pat. No. 9,457,854, entitled "Track Assembly for Farm Implement," the contents of which are herein incorporated in their entirety. The disclosures therein related to propulsion systems, are applicable to grain carts of embodiments herein described.

Folding augers for grain carts are described in U.S. Pat. No. 9,216,681, entitled "Grain Cart with Folding Auger," the contents of which are herein incorporated in their entirety. The disclosures therein related to folding augers, are applicable to grain carts of embodiments herein described.

Controls for automating unloading of a farm implement are described in U.S. Pat. No. 9,185,845, entitled "Method for controlling unload of a mobile farm implement"; U.S. Pat. No. 9,596,805, entitled "Method for controlling unload of a mobile farm implement"; and U.S. Pat. No. 10,028,434, entitled "Method for controlling upload of a mobile farm implement." The contents of these applications are herein incorporated in their entirety. The disclosures therein related to the control devices and automated control of farm implements, are applicable to the grain carts of embodiments herein described.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A farm implement comprising:
   a frame;
   a container mounted on the frame and configured to hold agricultural material, the container having a container opening to receive agricultural material and a discharge opening for discharging agricultural material;
   a first auger assembly disposed in the container and operable to move agricultural material from the container toward the discharge opening;
   a second auger assembly including an inlet in communication with the discharge opening to receive agricultural material therefrom and an outlet to discharge agricultural material; and
   a drive assembly;
   wherein the first auger assembly comprises a first auger section comprising a first auger shaft configured to rotate about a longitudinal axis of the first auger section and a first helical flighting disposed along the first auger shaft;
   wherein the second auger assembly comprises a second auger section comprising a second auger shaft configured to rotate about a longitudinal axis of the second auger section and a second helical flighting disposed along the second auger shaft;
   wherein a first end of the first auger shaft located at or around the discharge opening of the container is in proximity with a second end of the second auger shaft located at or around the inlet of the second auger assembly;
   wherein the drive assembly comprises a first member disposed at the first end of the first auger shaft and operably connected to the first auger shaft to drive the first auger shaft, the drive assembly further including a second member disposed at the second end of the second auger shaft and operably connected to the second auger shaft to drive the second auger shaft;
   wherein a power input device is connected to the first and second members of the drive assembly;
   wherein the longitudinal axes of the first and second auger sections are substantially coplanar;
   wherein the second helical flighting extends at least in part below the longitudinal axis of the first auger section when the second auger assembly is in an operating position,
   wherein the second auger assembly comprises an intake housing disposed proximate to the inlet, and
   wherein the drive assembly comprises a casing connected to the power input device, first member, and second member, and the casing is disposed in the intake housing.

2. The farm implement of claim 1, wherein the power input device is an input shaft configured to be driven by a power take-off (PTO).

3. The farm implement of claim 2, wherein the drive assembly includes a transmission shaft directly coupled to the input shaft and operatively connected to the first member such that the transmission shaft is configured to transmit torque applied by the input shaft to the first member.

4. The farm implement of claim 2, wherein the drive assembly includes a second gear assembly operatively connecting the input shaft to the second drive member, and the second gear assembly includes a first bevel gear received around the input shaft and a second bevel gear received around the second drive member, and
   wherein the first bevel gear is configured to rotatably engage the second bevel gear to transmit torque applied by the input shaft to the second drive member.

5. The farm implement of claim 1, wherein the second auger assembly is moveable between a first operating position capable of discharging grain on a first side of the farm implement and a second operating position capable of discharging grain on a second side of the farm implement.

6. The farm implement of claim 1, wherein the second auger assembly is angled such that the longitudinal axes of the first and second auger sections are not orthogonal.

7. The farm implement of claim 1, wherein the second auger assembly is angled forward such that an angle between the longitudinal axis of the second auger section and the longitudinal axis of the first auger section is greater than 45 degrees.

8. The farm implement of claim 1, wherein the second auger assembly further comprises:
  a third auger section comprising a third auger shaft configured to rotate about a longitudinal axis of the third auger section and a third helical flighting disposed along the third auger shaft,
  a joint connecting the second and third auger sections together and defining a pivot axis about which the third auger section is pivotable relative to the second auger section, and
  a folding assembly configured to pivot the second and third auger sections between an operating position in which the second and third helical flightings are operably coupled to permit grain to be discharged from the container and a transport position in which the third auger section extends along a wall of the container to facilitate transporting the farm implement.

9. The farm implement of claim 1, wherein the power input device is connected between the first and second members of the drive assembly.

10. A farm implement comprising:
  a frame;
  a container mounted on the frame and configured to hold agricultural material, the container having a container opening to receive agricultural material and a discharge opening for discharging agricultural material;
  a first auger assembly disposed in the container and operable to move agricultural material from the container toward the discharge opening;
  a second auger assembly including an inlet in communication with the discharge opening to receive agricultural material therefrom and an outlet to discharge agricultural material; and
  a drive assembly;
  wherein the first auger assembly comprises a first auger section comprising a first auger shaft configured to rotate about a longitudinal axis of the first auger section and a first helical flighting disposed along the first auger shaft;
  wherein the second auger assembly comprises a second auger section comprising a second auger shaft configured to rotate about a longitudinal axis of the second auger section and a second helical flighting disposed along the second auger shaft;
  wherein a first end of the first auger shaft located at or around the discharge opening of the container is in proximity with a second end of the second auger shaft located at or around the inlet of the second auger assembly;
  wherein the drive assembly comprises a first member disposed at the first end of the first auger shaft and operably connected to the first auger shaft to drive the first auger shaft, the drive assembly further including a second member disposed at the second end of the second auger shaft and operably connected to the second auger shaft to drive the second auger shaft;
  wherein a power input device is connected to the first and second members of the drive assembly;
  wherein the longitudinal axes of the first and second auger sections are substantially coplanar;
  wherein the second helical flighting extends at least n part below the longitudinal axis of the first auger section when the second auger assembly is in an operating position,
  wherein the power input device is an input shaft configured to be driven by a power take-off (PTO),
  wherein the drive assembly includes a transmission shaft directly coupled to the input shaft and operatively connected to the first member such that the transmission shaft is configured to transmit torque applied by the input shaft to the first member, and
  wherein the transmission shaft is substantially axially aligned with respect to the input shaft.

11. A farm implement comprising:
  a frame;
  a container mounted on the frame and configured to hold agricultural material, the container having a container opening to receive agricultural material and a discharge opening for discharging agricultural material;
  a first auger assembly disposed in the container and operable to move agricultural material from the container toward the discharge opening;
  a second auger assembly including an inlet in communication with the discharge opening to receive agricultural material therefrom and an outlet to discharge agricultural material; and
  a drive assembly;
  wherein the first auger assembly comprises a first auger section comprising a first auger shaft configured to rotate about a longitudinal axis of the first auger section and a first helical flighting disposed along the first auger shaft;
  wherein the second auger assembly comprises a second auger section comprising a second auger shaft configured to rotate about a longitudinal axis of the second auger section and a second helical flighting disposed along the second auger shaft;
  wherein a first end of the first auger shaft located at or around the discharge opening of the container is in proximity with a second end of the second auger shaft located at or around the inlet of the second auger assembly;
  wherein the drive assembly comprises a first member disposed at the first end of the first auger shaft and operably connected to the first auger shaft to drive the first auger shaft, the drive assembly further including a second member disposed at the second end of the second auger shaft and operably connected to the second auger shaft to drive the second auger shaft;
  wherein a power input device is connected to the first and second members of the drive assembly;
  wherein the longitudinal axes of the first and second auger sections are substantially coplanar;
  wherein the second helical flighting extends at least n part below the longitudinal axis of the first auger section when the second auger assembly is in an operating position,
  wherein the power input device is an input shaft configured to be driven by a power take-off (PTO),
  wherein the drive assembly includes a transmission shaft directly coupled to the input shaft and operatively connected to the first member such that the transmission shaft is configured to transmit torque applied by the input shaft to the first member, and
  wherein the drive assembly includes a first gear assembly operatively connecting the transmission shaft to the first member, and the first gear assembly comprising two or more gears substantially aligned in a vertical direction between the first member and the transmission shaft.

12. The farm implement of claim 11, wherein the drive assembly comprises a clutch tube received around the transmission shaft, and the clutch tube is configured to rotate with the transmission shaft and comprises one or more cogs disposed at a first end of the clutch tube;
   wherein the clutch tube is configured to slide along the transmission shaft in an axial direction between an engaged position, wherein the one or more cogs engage the first gear assembly so that torque is applied from the transmission shaft to the first gear assembly, and a disengaged position, wherein the one or more cogs are spatially separated from the first gear assembly so that torque is not applied from the transmission shaft to the first gear assembly.

13. The farm implement of claim 12, wherein the drive assembly includes a clutch actuator shaft operatively connected to the clutch tube to actuate movement of the clutch tube between the disengaged and engaged positions.

14. The farm implement of claim 13, wherein the clutch actuator shaft is configured to move the clutch tube from the engaged position to the disengaged position when a torque applied to the first auger assembly exceeds a predetermined maximum operation torque.

15. The farm implement of claim 13, wherein the casing defines a bore extending parallel with respect to the first auger shaft and a cavity extending substantially orthogonal to the bore and opening into the bore, and
   wherein the power input device and the second member extend into the bore of the casing, and the first member extends into the cavity of the casing.

16. A farm implement comprising:
a frame;
a container mounted on the frame and configured to hold agricultural material, the container having a container opening to receive agricultural material and a discharge opening for discharging agricultural material;
a first auger assembly disposed in the container and operable to move agricultural material from the container toward the discharge opening;
a second auger assembly including an inlet in communication with the discharge opening to receive agricultural material therefrom and an outlet to discharge agricultural material; and
a drive assembly;
wherein the first auger assembly comprises a first auger section comprising a first auger shaft configured to rotate about a longitudinal axis of the first auger section and a first helical flighting disposed along the first auger shaft;
wherein the second auger assembly comprises a second auger section comprising a second auger shaft configured to rotate about a longitudinal axis of the second auger section and a second helical flighting disposed along the second auger shaft;
wherein a first end of the first auger shaft located at or around the discharge opening of the container is in proximity with a second end of the second auger shaft located at or around the inlet of the second auger assembly;
wherein the drive assembly comprises a first member disposed at the first end of the first auger shaft and operably connected to the first auger shaft to drive the first auger shaft, the drive assembly further including a second member disposed at the second end of the second auger shaft and operably connected to the second auger shaft to drive the second auger shaft;
wherein a power input device is connected to the first and second members of the drive assembly;
wherein the longitudinal axes of the first and second auger sections are substantially coplanar;
wherein the second helical flighting extends at least in part below the longitudinal axis of the first auger section when the second auger assembly is in an operating position; and
wherein the second auger assembly is moveable between a first operating position capable of discharging grain on a first side of the farm implement and a second operating position capable of discharging grain on a second side of the farm implement,
the farm implement further comprising:
a hydraulic assembly operatively connected to the second auger assembly and configured to move the second auger assembly between the first and second operating positions;
an electronic over hydraulic (EOH) valve block assembly in communication with the hydraulic assembly and configured to control flow of a hydraulic fluid in the hydraulic assembly; and
a control device operatively connected to the EOH valve block assembly and configured to transmit a command to the EOH valve block assembly to actuate movement of the second auger assembly between the first and second operating positions.

17. The farm implement of claim 16, wherein the control device comprises a user interface configured to input one or more commands to the control device, and the one or more commands includes a predetermined operation position command;
   wherein in response to receiving the predetermined operation position command via the user interface, the control device is configured to transmit a command to the EOH valve block assembly to actuate movement of the second auger assembly to a predetermined operation position wherein the second auger assembly is capable of discharging grain on either the first side or the second side of the farm implement.

* * * * *

UNITED STATES PATENT AND TRADEMARK OFFICE
CERTIFICATE OF CORRECTION

| | | |
|---|---|---|
| PATENT NO. | : 10,743,474 B1 | Page 1 of 1 |
| APPLICATION NO. | : 16/359255 | |
| DATED | : August 18, 2020 | |
| INVENTOR(S) | : Ronald J. Schlimgen et al. | |

It is certified that error appears in the above-identified patent and that said Letters Patent is hereby corrected as shown below:

In the Specification

In Column 18, Lines 32-33, delete "extension 201" and insert --extension 202--, therefor.

In Column 18, Line 35, delete "extension 201" and insert --extension 202--, therefor.

In Column 18, Line 37, delete "extension 201" and insert --extension 202--, therefor.

In Column 18, Line 39, delete "extension 201" and insert --extension 202--, therefor.

In Column 21, Line 9, delete "assembly 120" and insert --assembly 1210--, therefor.

In Column 21, Line 20, delete "rail 190" and insert --rail 192--, therefor.

Signed and Sealed this
Thirteenth Day of September, 2022

Katherine Kelly Vidal
*Director of the United States Patent and Trademark Office*